(12) United States Patent
Li et al.

(10) Patent No.: US 12,520,204 B2
(45) Date of Patent: Jan. 6, 2026

(54) RELAY COMMUNICATION METHOD AND RELATED DEVICE

(71) Applicant: Huawei Technologies Co., Ltd., Shenzhen (CN)

(72) Inventors: Xiangyu Li, Shanghai (CN); Wenjie Peng, Shanghai (CN); Jun Wang, Shanghai (CN); Mingzeng Dai, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 458 days.

(21) Appl. No.: 17/957,594

(22) Filed: Sep. 30, 2022

(65) Prior Publication Data

US 2023/0029414 A1 Jan. 26, 2023

Related U.S. Application Data

(63) Continuation of application No. PCT/CN2021/079368, filed on Mar. 5, 2021.

(30) Foreign Application Priority Data

Apr. 10, 2020 (CN) .......................... 202010280916.2

(51) Int. Cl.
*H04W 36/30* (2009.01)
*H04W 36/00* (2009.01)

(52) U.S. Cl.
CPC ....... *H04W 36/0058* (2018.08); *H04W 36/03* (2018.08); *H04W 36/302* (2023.05)

(58) Field of Classification Search
CPC ............. H04W 36/0058; H04W 36/03; H04W 36/302

(Continued)

(56) References Cited

U.S. PATENT DOCUMENTS 10,609,611 B2 * 3/2020 Park .................. H04W 36/0079
11,070,996 B2 * 7/2021 Cho ....................... H04W 24/08
(Continued)

FOREIGN PATENT DOCUMENTS

CN 107071842 A 8/2017
CN 107439040 A 12/2017
(Continued)

OTHER PUBLICATIONS

L. Chen et al., "Mobile relay in LTE-advanced systems," in IEEE Communications Magazine, vol. 51, No. 11, pp. 144-151, Nov. 2013, doi: 10.1109/MCOM.2013.6658666. (Year: 2013).*

(Continued)

*Primary Examiner* — Melvin H Pollack
(74) *Attorney, Agent, or Firm* — Slater Matsil, LLP

(57) ABSTRACT

Embodiments of this application provide a communication method and a related device. The method includes: a network device firstly sends the configuration information to the user equipment, and then the user equipment obtains a first condition based on the configuration information. Then, in a measurement process, the user equipment sends a measurement report to the network device when determining that the first condition is currently met. After obtaining the measurement report, the network device indicates at least one candidate relay device to the user equipment by using a path switch command. The user equipment determines one relay device in the at least one candidate relay device, and communicates with the network device or another network device through the determined relay device.

20 Claims, 10 Drawing Sheets

(58) Field of Classification Search
USPC .......................................................... 370/331
See application file for complete search history.

(56) References Cited

U.S. PATENT DOCUMENTS

| | | | | |
|---|---|---|---|---|
| 11,159,972 | B2 * | 10/2021 | Akkarakaran | G01S 5/012 |
| 11,206,549 | B1 * | 12/2021 | Eyuboglu | H04W 72/1273 |
| 11,228,948 | B2 * | 1/2022 | Murray | H04L 5/0048 |
| 11,246,072 | B2 * | 2/2022 | Karampatsis | H04W 88/04 |
| 11,290,923 | B2 * | 3/2022 | Akdeniz | B64C 39/024 |
| 11,323,213 | B2 * | 5/2022 | Li | H04L 1/1896 |
| 11,330,653 | B2 * | 5/2022 | Paladugu | H04W 24/10 |
| 11,337,160 | B2 * | 5/2022 | Wang | H04W 52/146 |
| 11,362,921 | B2 * | 6/2022 | Bhushan | H04W 56/0065 |
| 11,445,429 | B2 * | 9/2022 | Islam | H04W 28/0942 |
| 11,452,032 | B2 * | 9/2022 | Gupta | H04W 4/021 |
| 11,546,103 | B2 * | 1/2023 | Akkarakaran | H04L 5/0094 |
| 11,546,827 | B2 * | 1/2023 | Mok | H04W 40/34 |
| 11,570,640 | B2 * | 1/2023 | Tekgul | H04B 7/15 |
| 11,595,112 | B2 * | 2/2023 | Kusashima | H04L 5/0032 |
| 11,632,683 | B2 * | 4/2023 | Panaitopol | H04W 84/18 370/252 |
| 11,641,605 | B2 * | 5/2023 | Deenoo | H04W 76/19 370/331 |
| 11,641,644 | B2 * | 5/2023 | Badic | G05D 1/606 370/329 |
| 11,671,858 | B2 * | 6/2023 | Lee | H04W 76/19 370/242 |
| 11,824,933 | B2 * | 11/2023 | Binder | H04L 67/12 |
| 11,864,031 | B2 * | 1/2024 | Tsai | H04W 36/0016 |
| 11,937,136 | B2 * | 3/2024 | Hong | H04W 36/362 |
| 11,985,095 | B2 * | 5/2024 | Lee | H04W 56/00 |
| 12,004,111 | B2 * | 6/2024 | Shan | H04W 4/40 |
| 12,010,619 | B2 * | 6/2024 | Zhou | H04W 24/02 |
| 12,035,368 | B2 * | 7/2024 | Kusashima | H04W 74/0816 |
| 12,040,880 | B2 * | 7/2024 | Speidel | H04W 16/10 |
| 12,063,536 | B2 * | 8/2024 | Teyeb | H04W 24/10 |
| 12,075,505 | B2 * | 8/2024 | Muhammad | H04W 40/22 |
| 12,082,061 | B2 * | 9/2024 | Rune | H04W 36/32 |
| 12,120,570 | B2 * | 10/2024 | Eklöf | H04W 36/24 |
| 12,133,197 | B2 * | 10/2024 | Lee | H04W 64/006 |
| 12,156,272 | B2 * | 11/2024 | Zhu | H04L 1/1864 |
| 12,160,832 | B2 * | 12/2024 | Wigard | H04B 7/1851 |
| 2018/0123682 | A1 | 5/2018 | Jung et al. | |
| 2020/0344654 | A1 | 10/2020 | Zhao et al. | |
| 2021/0385897 | A1 * | 12/2021 | Purkayastha | H04W 36/087 |
| 2022/0053449 | A1 * | 2/2022 | Shan | H04W 36/0066 |
| 2022/0408285 | A1 * | 12/2022 | Hong | H04L 27/26025 |
| 2023/0063137 | A1 * | 3/2023 | Matsumura | H04B 7/088 |
| 2023/0072323 | A1 * | 3/2023 | Matsumura | H04L 5/0053 |
| 2023/0092358 | A1 * | 3/2023 | Ozturk | H04W 24/02 370/329 |
| 2023/0180091 | A1 * | 6/2023 | Venkata | H04W 24/08 370/331 |
| 2024/0284280 | A1 * | 8/2024 | Jin | H04W 36/085 |

FOREIGN PATENT DOCUMENTS

| | | | | |
|---|---|---|---|---|
| CN | 108495342 | A | | 9/2018 |
| CN | 110035464 | A | | 7/2019 |
| CN | 109392034 | B | * | 9/2020 ............ H04W 36/00 |
| EP | 3311605 | B1 | * | 4/2022 ............ H04W 16/32 |
| WO | 2019134163 | A1 | | 7/2019 |
| WO | WO-2023154371 | A1 | * | 8/2023 |

OTHER PUBLICATIONS

B. Raghothaman, E. Deng, R. Pragada, G. Sternberg, T. Deng and K. Vanganuru, "Architecture and protocols for LTE-based device to device communication," 2013 International Conference on Computing, Networking and Communications (ICNC), San Diego, CA, USA, 2013, pp. 895-899. (Year: 2013).*

Altaf Shaik et al. "New vulnerabilities in 4G and 5G cellular access network protocols: exposing device capabilities." In Proceedings of the 12th Conference on Security and Privacy in Wireless and Mobile Networks (WiSec '19). Association for Computing Machinery , New York, NY, USA, 221-231. (Year: 2019).*

O. Bello and S. Zeadally, "Intelligent Device-to-Device Communication in the Internet of Things," in IEEE Systems Journal, vol. 10, No. 3, pp. 1172-1182, Sep. 2016, doi: 10.1109/JSYST.2014. 2298837. (Year: 2016).*

"3rd Generation Partnership Project; Technical Specification Group Services and System Aspects; Study on Architecture Enhancements to ProSe UE-to-Network Relay (Release 15)," 3GPP TR 23.733 V15.1.0, Dec. 2012, 81 pages.

"3rd Generation Partnership Project; Technical Specification Group Radio Access Network; Study on further enhancements to LTE Device to Device (D2D), User Equipment (UE) to network relays for Internet of Things (IoT) and wearables; (Release 15)," 3GPP TR 36.746 V15.1.1, Apr. 2018, 55 pages.

"3rd Generation Partnership Project; Technical Specification Group Services and System Aspects; Proximity-based services (ProSe); Stage 2 (Release 15)," 3GPP TS 23.303 V15.1.0, Jun. 2018, 130 pages.

"3rd Generation Partnership Project; Technical Specification Group Radio Access Network; NR; NR and NG-RAN Overall Description; Stage 2 (Release 16)," 3GPP TS 38.300 V16.1.0, Mar. 2020, 133 pages.

"3rd Generation Partnership Project; Technical Specification Group Radio Access Network; NR; Radio Resource Control (RRC) protocol specification (Release 16)," 3GPP TS 38.331 V16.0.0, Mar. 2020, 835 pages.

"Path selection criteria," Agenda item: 8.4.2.3, Source: Intel Corporation, Document for: Discussion and decision, 3GPP TSG RAN WG2 Meeting #95bis, R2-166254, Kaohsiung, Oct. 10-14, 2016, 2 pages.

"Path selection and switch," Agenda item: 8.4.2.3, Source: LG Electronics Inc., Document for: Discussion and Decision, 3GPP TSG-RAN2 Meeting #95bis, R2-166663, Kaohsiung, Taiwan, Oct. 10-14, 2016, 3 pages.

"Path switch between direct and indirect communications," Agenda item: 9.1.2.3, Source: Nokia, Alcatel-Lucent Shanghai Bell, Ericsson, WID/SID: FS_feD2D_IoT_relay_wearable—Release 15, Document for: Discussion and Decision, 3GPP TSG-RAN WG2 Meeting #98, R2-1704328, Hangzhou, China, May 15-19, 2017, 4 pages.

LG Electronics Inc., "Options for path switching," 3GPP TSG-RAN WG2 Meeting #98, R2-1704537, May 15-19, 2017, Hangzhou, China, 4 pages.

Huawei et al., "Path switch procedure Uu and PC5," 3GPP TSG-RAN WG2 Meeting #98, R2-1704715, May 15-19, 2017, Hangzhou, China, 5 pages.

* cited by examiner

RELAY COMMUNICATION METHOD AND RELATED DEVICE

CROSS-REFERENCE TO RELATED APPLICATIONS

This application is a continuation of International Application No. PCT/CN2021/079368, filed on Mar. 5, 2021, which claims priority to Chinese Patent Application No. 202010280916.2, filed on Apr. 10, 2020. The disclosures of the aforementioned applications are hereby incorporated by reference in their entireties.

TECHNICAL FIELD

This application relates to the field of communication technologies, and more specifically, to a relay communication method and a related device.

BACKGROUND

In a relay communication scenario, a relay device is required when a network device communicates with user equipment (UE). Generally, when the user equipment communicates with the network device through the relay device, a PC5 link between the user equipment and the relay device and a Uu link between the relay device and the network device may be referred to as an indirect path. Generally, when the user equipment directly communicates with the network device, a Uu link between the user equipment and the network device may be referred to as a direct path. However, when the user equipment performs path switching (path switch) between a plurality of indirect paths, or when the user equipment performs path switching between an indirect path and a direct path, there is no appropriate solution in an existing mechanism to resolve a problem that how the network device configures the user equipment to perform appropriate measurement or path switching selection.

SUMMARY

In view of this, this application provides a communication method and a related device, so that user equipment can perform appropriate measurement or path switching selection, to ensure service continuity.

According to a first aspect, this application provides a communication method. The method may include: First user equipment receives first configuration information from a first network device. The first user equipment obtains a first condition based on the first configuration information. The first user equipment sends a measurement report to the first network device when the first condition is met. The first user equipment receives a path switch command from the first network device, where the path switch command includes identification information of X third user equipments, and X is a positive integer. The first user equipment determines a second relay device in the X third user equipments. The first user equipment communicates with a second network device through the second relay device. According to this method, for example, a beneficial effect includes: The user equipment can perform appropriate measurement and path switching selection by using a network control method.

In a first feasible design of the first aspect, that the first user equipment determines a second relay device in the X third user equipments includes: When X is equal to 1, the first user equipment determines that the third user equipment is the second relay device. When X is greater than 1, the first user equipment selects the second relay device from the third user equipments. According to this design, for example, a beneficial effect includes: Both network control and user equipment autonomous selection can be considered.

In a second feasible design of the first aspect, that first user equipment receives first configuration information from a first network device includes: The first user equipment receives the first configuration information through a wireless communication link between the first user equipment and the first network device; or the first user equipment receives the first configuration information from the first network device through a first relay device. According to this design, for example, a beneficial effect includes: The method is not only applicable to user equipment currently on a direct path, but also applicable to user equipment currently on an indirect path.

In a third feasible design of the first aspect, the first condition includes any one of the following: a reference signal measurement value corresponding to the first network device is less than or less than or equal to a first threshold; a reference signal measurement value corresponding to second user equipment is greater than or greater than or equal to a second threshold; a reference signal measurement value corresponding to the first network device is less than or less than or equal to a first threshold, and a reference signal measurement value corresponding to second user equipment is greater than or greater than or equal to a second threshold; a reference signal measurement value corresponding to second user equipment is greater than or greater than or equal to a sum of a reference signal measurement value corresponding to the first network device and a first offset; a reference signal measurement value corresponding to the first relay device is less than or less than or equal to a third threshold; a reference signal measurement value corresponding to the first relay device is less than or less than or equal to a third threshold, and a reference signal measurement value corresponding to second user equipment is greater than or greater than or equal to a fourth threshold; or a reference signal measurement value corresponding to second user equipment is greater than or greater than or equal to a sum of a reference signal measurement value corresponding to the first relay device and a second offset. According to this design, for example, a beneficial effect includes: The network device may flexibly control a reporting occasion of the measurement report of the user equipment by delivering different first conditions.

In a fourth feasible design of the first aspect, that the first user equipment obtains a first condition based on the first configuration information includes: The first configuration information includes the first condition, and the first user equipment obtains the first condition from the first configuration information. According to this design, for example, a beneficial effect includes: Air interface signaling overheads can be reduced, and efficiency of obtaining the first condition by the user equipment can be improved.

Based on the fourth feasible design of the first aspect, in a fifth feasible design of the first aspect, the first configuration information further includes first measurement object information, and the first measurement object information includes at least one of carrier information, a cell identifier, a user equipment identifier, and a network device identifier. When the first measurement object information includes the carrier information, a measurement object indicated by the first measurement object information is user equipment that works on a carrier corresponding to the carrier information.

Alternatively, when the first measurement object information includes the cell identifier, a measurement object indicated by the first measurement object information is user equipment in a cell corresponding to the cell identifier. Alternatively, when the first measurement object information includes the user equipment identifier, a measurement object indicated by the first measurement object information is user equipment corresponding to the user equipment identifier. Alternatively, when the first measurement object information includes the network device identifier, a measurement object indicated by the first measurement object information is user equipment that camps on or is connected to a network device corresponding to the network device identifier. According to this design, for example, a beneficial effect includes: Measurement efficiency of the user equipment can be improved.

In a sixth feasible design of the first aspect, that the first user equipment obtains a first condition based on the first configuration information includes: The first configuration information includes second measurement object information and a measurement event, and the first user equipment obtains the first condition based on the second measurement object information and the measurement event, where the second measurement object information indicates the first user equipment to measure other user equipment, and the measurement event may include any one of the following: a reference signal measurement value corresponding to a current node (for example, a serving node, for example, the first network device or the first relay device) is less than or less than or equal to a first threshold; a reference signal measurement value (which may be a reference signal measurement value corresponding to other user equipment, another cell, or another carrier) is greater than or greater than or equal to a second threshold; a reference signal measurement value corresponding to a current node is less than or less than or equal to a first threshold, and a reference signal measurement value is greater than or greater than or equal to a second threshold; or a reference signal measurement value is greater than or greater than or equal to a sum of a reference signal measurement value corresponding to a current node and a first offset. According to this design, for example, a beneficial effect includes: Efficiency of updating or modifying the first condition can be improved, and air interface overheads of update information of the first condition can be reduced.

Based on the sixth feasible design of the first aspect, in a seventh feasible design of the first aspect, the second measurement object information further includes at least one of carrier information, a cell identifier, a user equipment identifier, and a network device identifier. When the second measurement object information includes the carrier information, a measurement object indicated by the second measurement object information is user equipment that works on a carrier corresponding to the carrier information. Alternatively, when the second measurement object information includes the cell identifier, a measurement object indicated by the second measurement object information is user equipment in a cell corresponding to the cell identifier. Alternatively, when the second measurement object information includes the user equipment identifier, a measurement object indicated by the second measurement object information is user equipment corresponding to the user equipment identifier. Alternatively, when the second measurement object information includes the network device identifier, a measurement object indicated by the second measurement object information is user equipment that camps on or is connected to a network device corresponding to the network device identifier. According to this design, for example, a beneficial effect includes: Measurement efficiency of the user equipment can be improved.

In an eighth feasible design of the first aspect, the method includes: The first user equipment sends a solicitation message, where the solicitation message includes the first or second measurement object information; the first user equipment receives a response message from the user equipment indicated by the first or second measurement object information; and the first user equipment obtains a measurement value of the response message, and uses the measurement value of the response message as a reference signal measurement value corresponding to the user equipment indicated by the first or second measurement object information. Alternatively, the first user equipment sends a solicitation message; the first user equipment receives a response message; and when user equipment that sends the response message belongs to the user equipment indicated by the first or second measurement object information, the first user equipment obtains a measurement value of the response message, and uses the measurement value of the response message as a reference signal measurement value corresponding to the user equipment indicated by the first or second measurement object information. Alternatively, the first user equipment receives an announcement message; and when user equipment that sends the announcement message belongs to the user equipment indicated by the first or second measurement object information, the first user equipment obtains a measurement value of the announcement message, and uses the measurement value of the announcement message as a reference signal measurement value corresponding to the user equipment indicated by the first or second measurement object information. According to this design, for example, a beneficial effect includes: The user equipment can obtain the required reference signal measurement value.

In a ninth feasible design of the first aspect, the first network device and the second network device are a same network device, or the first network device and the second network device are different network devices. According to this design, for example, a beneficial effect includes: The method is not only applicable to path switching in a base station, but also applicable to path switching between base stations.

In a tenth feasible design of the first aspect, the reference signal measurement value includes a reference signal received power (RSRP) value, reference signal received quality (RSRQ), a signal to interference plus noise ratio (SINR), or a received signal strength indicator (RSSI). According to this design, for example, a beneficial effect includes: The user equipment can flexibly obtain the reference signal measurement value.

In an eleventh feasible design of the first aspect, the first configuration information is carried in a radio resource control (RRC) message.

In a twelfth feasible design of the first aspect, the first user equipment further sends a path switch complete (path switch command complete) message to the second network device, where the message is used to indicate that the first user equipment is successfully switched to the second network device.

According to a second aspect, this application provides a communication method.

The method may include: First user equipment receives first configuration information from a first network device. The first user equipment obtains a second condition based on the first configuration information. The first user equipment sends a measurement report to the first network device when the second condition is met. The first user equipment receives a path switch command from the first network device, where the path switch command includes identification information of Y cells or Y carriers, and Y is a positive integer. The first user equipment determines a first cell or a first carrier. The first user equipment communicates with a second network device through the first cell, or communicates with a second network device through the first carrier.

In a first feasible design of the second aspect, that the first user equipment determines a first cell or a first carrier includes: When Y is equal to 1, the first user equipment determines that a cell included in the path switch command is the first cell, or determines that a carrier included in the path switch command is the first carrier. When Y is greater than 1, the first user equipment selects the first cell from the Y cells, or selects the first carrier from the Y carriers.

In a second feasible design of the second aspect, that first user equipment receives first configuration information from a first network device includes: The first user equipment receives the first configuration information through a wireless communication link between the first user equipment and the first network device; or the first user equipment receives the first configuration information from the first network device through a first relay device.

In a third feasible design of the second aspect, the second condition includes any one of the following: a reference signal measurement value corresponding to a serving cell is less than or less than or equal to a ninth threshold; a reference signal measurement value corresponding to another cell is greater than or greater than or equal to a tenth threshold; a reference signal measurement value corresponding to a serving cell is less than or less than or equal to a ninth threshold, and a reference signal measurement value corresponding to another cell is greater than or greater than or equal to a tenth threshold; a reference signal measurement value corresponding to another cell is greater than or greater than or equal to a sum of a reference signal measurement value corresponding to a serving cell and a fifth offset; a reference signal measurement value corresponding to a serving carrier is less than or less than or equal to a ninth threshold; a reference signal measurement value corresponding to another carrier is greater than or greater than or equal to a tenth threshold; a reference signal measurement value corresponding to a serving carrier is less than or less than or equal to a ninth threshold, and a reference signal measurement value corresponding to another carrier is greater than or greater than or equal to a tenth threshold; a reference signal measurement value corresponding to another carrier is greater than or greater than or equal to a sum of a reference signal measurement value corresponding to a serving carrier and a fifth offset; a reference signal measurement value corresponding to the first relay device is less than or less than or equal to an eleventh threshold; a reference signal measurement value corresponding to the first relay device is less than or less than or equal to an eleventh threshold, and a reference signal measurement value corresponding to a cell is greater than or greater than or equal to a twelfth threshold; a reference signal measurement value corresponding to a cell is greater than or greater than or equal to a sum of a reference signal measurement value corresponding to the first relay device and a sixth offset; a reference signal measurement value corresponding to the first relay device is less than or less than or equal to an eleventh threshold, and a reference signal measurement value corresponding to a carrier is greater than or greater than or equal to a twelfth threshold; or a reference signal measurement value corresponding to a carrier is greater than or greater than or equal to a sum of a reference signal measurement value corresponding to the first relay device and a sixth offset.

In a fourth feasible design of the second aspect, that the first user equipment obtains a second condition based on the first configuration information includes: The first configuration information includes the second condition, and the first user equipment obtains the second condition from the first configuration information.

Based on the fourth feasible design of the second aspect, in a fifth feasible design of the second aspect, the first configuration information further includes third measurement object information, and the third measurement object information includes at least one of carrier information, a cell identifier, a user equipment identifier, and a network device identifier. When the third measurement object information includes the carrier information, a measurement object indicated by the third measurement object information is a carrier corresponding to the carrier information. Alternatively, when the third measurement object information includes the cell identifier, a measurement object indicated by the third measurement object information is a cell corresponding to the cell identifier. Alternatively, when the third measurement object information includes the user equipment identifier, a measurement object indicated by the third measurement object information is a cell in which user equipment corresponding to the user equipment identifier is located or a carrier on which user equipment corresponding to the user equipment identifier is located. Alternatively, when the third measurement object information includes the network device identifier, a measurement object indicated by the third measurement object information is a cell or a carrier served by a network device corresponding to the network device identifier.

In a sixth feasible design of the second aspect, that the first user equipment obtains a second condition based on the first configuration information includes: The first configuration information includes fourth measurement object information and a measurement event, and the first user equipment obtains the second condition based on the fourth measurement object information and the measurement event, where the fourth measurement object information indicates the first user equipment to measure a cell or a carrier, and the measurement event may include any one of the following: a reference signal measurement value corresponding to a current node (for example, a serving node, which may be the first network device or the first relay device) is less than or less than or equal to a first threshold; a reference signal measurement value (which may be a reference signal measurement value corresponding to other user equipment, another cell, or another carrier) is greater than or greater than or equal to a second threshold; a reference signal measurement value corresponding to a current node is less than or less than or equal to a first threshold, and a reference signal measurement value is greater than or greater than or equal to a second threshold; or a reference signal measurement value is greater than or greater than or equal to a sum of a reference signal measurement value corresponding to a current node and a first offset.

Based on the sixth feasible design of the second aspect, in a seventh feasible design of the second aspect, the fourth measurement object information further includes at least one of carrier information, a cell identifier, a user equipment identifier, and a network device identifier. When the fourth measurement object information includes the carrier information, a measurement object indicated by the fourth measurement object information is a carrier corresponding to the carrier information. Alternatively, when the fourth measurement object information includes the cell identifier, a measurement object indicated by the fourth measurement object information is a cell corresponding to the cell identifier. Alternatively, when the fourth measurement object information includes the user equipment identifier, a measurement object indicated by the fourth measurement object information is a cell in which user equipment corresponding to the user equipment identifier is located or a carrier on which user equipment corresponding to the user equipment identifier is located. Alternatively, when the fourth measurement object information includes the network device identifier, a measurement object indicated by the fourth measurement object information is a cell or a carrier served by a network device corresponding to the network device identifier.

In a seventh feasible design of the second aspect, the first network device and the second network device are a same network device, or the first network device and the second network device are different network devices. According to this design, for example, a beneficial effect includes: The method is not only applicable to path switching in a base station, but also applicable to path switching between base stations.

In an eighth feasible design of the second aspect, the reference signal measurement value includes a reference signal received power (RSRP) value, reference signal received quality (RSRQ), a signal to interference plus noise ratio (SINR), or a received signal strength indicator (RSSI). According to this design, for example, a beneficial effect includes: The user equipment can flexibly obtain the reference signal measurement value.

In a ninth feasible design of the second aspect, the first configuration information is carried in a radio resource control (RRC) message.

According to a third aspect, this application provides a communication method. The method may include: First user equipment receives second configuration information from a first network device. The first user equipment obtains a fourth condition based on the second configuration information. The first user equipment determines Y fourth user equipments that meet the fourth condition, where Y is a positive integer. The first user equipment determines a third relay device in the Y fourth user equipments. The first user equipment communicates with a second network device through the third relay device.

In a first possible design of the third aspect, the fourth user equipment that meets the fourth condition includes any one of the following: a reference signal measurement value corresponding to the fourth user equipment is greater than or greater than or equal to a fifth threshold; a reference signal measurement value corresponding to the first network device is less than or less than or equal to a sixth threshold, and a reference signal measurement value corresponding to the fourth user equipment is greater than or greater than or equal to a fifth threshold; a reference signal measurement value corresponding to the fourth user equipment is greater than or greater than or equal to a sum of a reference signal measurement value corresponding to the first network device and a third offset; a reference signal measurement value corresponding to a first relay device is less than or less than or equal to an eighth threshold, and a reference signal measurement value corresponding to the fourth user equipment is greater than or greater than or equal to a seventh threshold; or a reference signal measurement value corresponding to the fourth user equipment is greater than or greater than or equal to a sum of a reference signal measurement value corresponding to a first relay device and a fourth offset.

In a second possible design of the third aspect, the first user equipment sends a path switch notification message to the first network device or the second network device through the third relay device.

According to a fourth aspect, this application provides a communication method. The method may include: A first network device sends first configuration information to first user equipment, where the first configuration information includes a first condition; or the first configuration information includes second measurement object information and a measurement event, and the first user equipment obtains a first condition based on the second measurement object information and the measurement event, where the second measurement object information indicates the first user equipment to measure other user equipment, and the measurement event may include any one of the following: a reference signal measurement value corresponding to a current node (for example, a serving node, for example, the first network device or a first relay device) is less than or less than or equal to a first threshold; a reference signal measurement value (which may be a reference signal measurement value corresponding to other user equipment, another cell, or another carrier) is greater than or greater than or equal to a second threshold; a reference signal measurement value corresponding to a current node is less than or less than or equal to a first threshold, and a reference signal measurement value is greater than or greater than or equal to a second threshold; or a reference signal measurement value is greater than or greater than or equal to a sum of a reference signal measurement value corresponding to a current node and a first offset.

In a first feasible design of the fourth aspect, that a first network device sends first configuration information to first user equipment includes: The first network device sends the first configuration information through a wireless communication link between the first network device and the first user equipment; or the first network device sends the first configuration information to the first user equipment through a first relay device.

In a second feasible design of the fourth aspect, the first condition includes any one of the following: a reference signal measurement value corresponding to the first network device is less than or less than or equal to a first threshold; a reference signal measurement value corresponding to second user equipment is greater than or greater than or equal to a second threshold; a reference signal measurement value corresponding to the first network device is less than or less than or equal to a first threshold, and a reference signal measurement value corresponding to second user equipment is greater than or greater than or equal to a second threshold; a reference signal measurement value corresponding to second user equipment is greater than or greater than or equal to a sum of a reference signal measurement value corresponding to the first network device and a first offset; a reference signal measurement value corresponding to the first relay device is less than or less than or equal to a third threshold; a reference signal measurement value corresponding to the first relay device is less than or less than or equal to a third threshold, and a reference signal measurement value corresponding to second user equipment is greater than or greater than or equal to a fourth threshold; or a reference signal measurement value corresponding to second user equipment is greater than or greater than or equal to a sum of a reference signal measurement value corresponding to the first relay device and a second offset.

In a third feasible design of the fourth aspect, the first network device receives a measurement report from the first user equipment.

In a fourth feasible design of the fourth aspect, the first network device sends a path switch command to the first user equipment.

According to a fifth aspect, this application provides an apparatus. The apparatus may include at least one processor and an interface circuit. When related program instructions are executed in the at least one processor, the communication apparatus is enabled to implement the method according to any one of the first aspect to the fourth aspect and the designs of the first aspect to the fourth aspect. The apparatus may be a terminal device or a network device, or a chip in the terminal device or in the network device in the method according to any one of the first aspect to the fourth aspect and the designs of the first aspect to the fourth aspect. Optionally, the communication apparatus may further include at least one memory, and the memory stores the related program instructions.

According to a sixth aspect, this application provides a computer-readable storage medium. The computer-readable storage medium may be applied to a communication apparatus. The computer-readable storage medium stores related program instructions. When the related program instructions are run, the communication apparatus is enabled to implement the method according to any one of the first aspect to the fourth aspect and the designs of the first aspect to the fourth aspect.

According to a seventh aspect, this application provides a computer program product. The computer program product includes related program instructions. When the related program instructions are executed, the method according to any one of the first aspect to the fourth aspect and the designs of the first aspect to the fourth aspect is implemented.

According to an eighth aspect, this application provides a communication apparatus. The apparatus is configured to perform the method according to any one of the first aspect to the fourth aspect and the designs of the first aspect to the fourth aspect.

BRIEF DESCRIPTION OF THE DRAWINGS

The accompanying drawings, which may be included in this specification and constitute a part of this specification, together with this specification show example embodiments, or features and aspects of this application, and are used to explain principles of this application. It is clear that the accompanying drawings in the following descriptions merely show some embodiments of this application, and a person of ordinary skill in the art can derive other drawings from these accompanying drawings without creative efforts.

DETAILED DESCRIPTION OF ILLUSTRATIVE EMBODIMENTS

Figure 1:
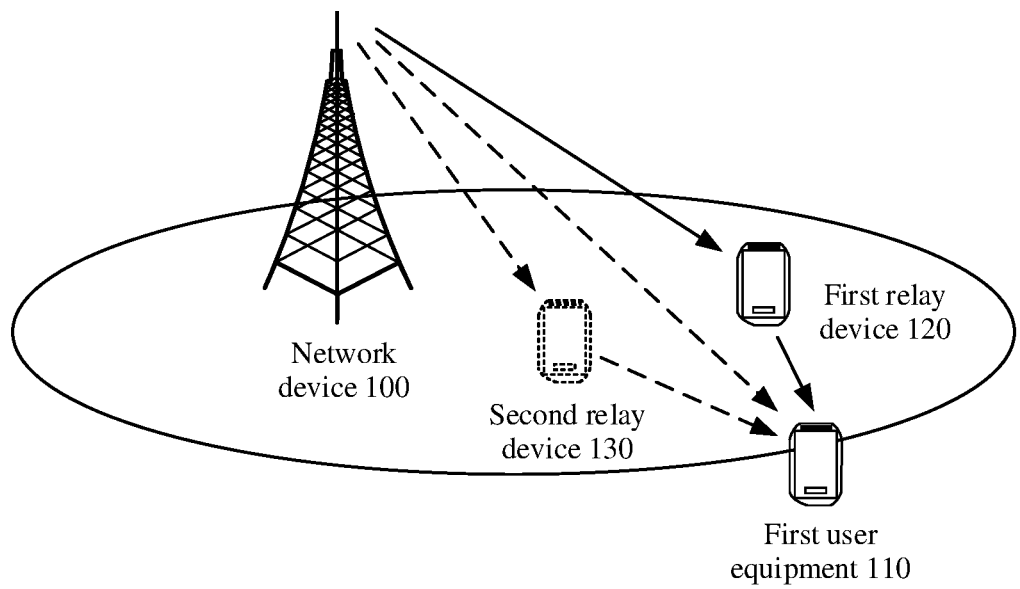
FIG. 1 is a schematic diagram of a possible communication system according to this application.

In descriptions of this application, terms such as "first", "second", "operation 201", or "operation 202" are merely used for distinguishing and description and for ease of organizing this article. Different sequences or numbers do not have specific technical meanings, and cannot be understood as indicating or implying relative importance, or indicating or implying an execution sequence of operations.

The term "and/or" in this application describes only an association relationship for associated objects, and indicates that three relationships may exist. For example, "A and/or B" may indicate the following three cases: Only A exists; both A and B exist; or only B exists. A and B may be singular or plural. In addition, the character "/" in this specification indicates an "or" relationship between the associated objects.

In this application, "transmission" may include the following three cases: data sending, data receiving, or data sending and data receiving. In this application, "data" may include service data and/or signaling data.

Thresholds, thresholds, offsets, preset values, or the like of user equipment in this application may be configured by a network device, or may be stored in user equipment when the user equipment is delivered from a factory, or may be standard-specified or standard-defined. Values of these thresholds, thresholds, offsets, or preset values may be 0.

In this application, the terms "include", "contain" and any other variants thereof are intended to cover the non-exclusive inclusion. For example, a process/method that includes a series of steps or a system/product/device that includes a series of units is not necessarily limited to those expressly listed steps or units, but may include other steps or units not expressly listed or inherent to these processes/methods/products/devices.

The solutions provided in embodiments of this application may be applied to various communication systems, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a worldwide interoperability for microwave access (WiMAX) communication system, a 5th generation (5G) mobile communication system, a new radio (NR) system, or another network system that can be used to provide a mobile communication service. This is not limited in this application.

In this application, a carrier may be a carrier used to carry information from a perspective of a physical layer. The carrier occupies a specific frequency range (for example, a frequency range represented by a center frequency and a bandwidth). A cell may be a unit that manages wireless communication from a perspective of higher layer resource management. The cell may include a carrier, and second configuration information of the cell may include second configuration information of the carrier. According to different duplex modes, a downlink carrier and an uplink carrier of a cell may be different (for example, in a frequency division duplex (FDD) system), or a downlink carrier and an uplink carrier of a cell may be the same (for example, in a time division duplex (TDD) system). In carrier aggregation/dual connectivity, a part of cells may include both a downlink carrier and an uplink carrier, and a part of cells may include only a downlink carrier. One carrier may correspond to a plurality of cells. In other words, different cells may correspond to a same carrier. Interference may be avoided between cells having a same carrier by using different azimuths deployed in the cells.

The following describes embodiments of this application with reference to the accompanying drawings. Features or content marked by dashed lines in the accompanying drawings may be understood as optional operations or optional structures in embodiments of this application.

As shown in FIG. 1, a communication system to which an embodiment of this application is applicable may include a network device 100, first user equipment 110, and a first relay device 120, and optionally include another relay device such as a second relay device 130. The network device 100 may communicate with the first user equipment no through the first relay device 120. In this case, a link between the network device and the first user equipment may be referred to as an indirect path. The network device 100 may communicate with the first relay device 120 through a wireless communication interface, for example, an LTE Uu interface or an NR Uu interface. The LTE Uu interface or the NR Uu interface may be a wireless communication interface between a radio access network (RAN) device and a terminal device in a cellular communication system. A wireless communication link used for uplink communication between a terminal device and a network device through the LTE Uu interface or the NR Uu interface may be referred to as an uplink (UL), and a wireless communication link used for downlink communication between the terminal device and the network device through the LTE Uu interface or the NR Uu interface may be referred to as a downlink (DL). The first relay device 120 may communicate with the first user equipment no through a wireless direct communication interface, for example, a PC5 interface. The PC5 interface may be a wireless communication interface for direct communication between terminal devices. The terminal devices may directly exchange data through the PC5 interface without forwarding the data through a cellular communication network. A communication link used for direct communication between terminal devices through the PC5 interface may be referred to as a sidelink (SL). The first relay device 120 may communicate with the first user equipment no through microwave, Wi-Fi, Bluetooth, or the like. Alternatively, the network device 100 may communicate with the first user equipment no through the second relay device 130. Alternatively, the network device 100 may directly communicate with the first user equipment 110 through a wireless communication interface. In this case, a link between the network device and the first user equipment may be referred to as a direct path. It should be noted that, the network architecture shown in FIG. 1 is merely an example architecture. Other than the network functional entities shown in FIG. 1, the communication system shown in FIG. 1 may further include another functional entity, for example, a core network element, more user equipment, or more relay devices. This is not limited in this application. In addition, in FIG. 1, for example, the first user equipment no is located at an edge or outside coverage of the network device, or the first user equipment no may be located at an edge or within coverage of the network device. For example, there may be no appropriate communication resource between the first user equipment no and the network device 100, or a communication resource between the first user equipment no and the network device 100 is not as good as a communication resource between the first relay device 120 and the network device 100 (for example, quality of the communication resource may be measured by using channel quality). In this case, the first user equipment no may communicate with the network device 100 through the first relay device 120. In conclusion, in the communication system shown in FIG. 1, there may be three different links between the first user equipment no and the network device. A link 1 includes an SL between the first user equipment no and the first relay device 120, and a Uu link between the first relay device 120 and the network device 100. A link 2 includes a Uu link between the first user equipment no and the network device 100. A link 3 includes an SL between the first user equipment no and the second relay device 130, and a Uu link between the second relay device 130 and the network device 100. One of the problems studied in this application is how to better implement path switching between the three possible different links (the link 1, the link 2, and the link 3) by the first user equipment no in FIG. 1.

The user equipment in FIG. 1 may be an access terminal device, a subscriber unit, a subscriber station, a mobile station, a remote station, a remote terminal device, a mobile device, a user terminal device, a wireless terminal device, a user agent, a user apparatus, or the like. The user equipment may alternatively be a cellular phone, a cordless phone, a session initiation protocol (SIP) phone, a wireless local loop (WLL) station, a personal digital assistant (PDA), a handheld device having a wireless communication function, a computing device, another processing device connected to a wireless modem, a vehicle-mounted device, a wearable device (such as a smartwatch or a smart band), smart furniture or a home appliance, a terminal device in a 5G network, a terminal device in a future evolved public land mobile network (PLMN), a vehicle device in vehicle-to-everything (V2X), a customer premises equipment (CPE), or the like. A specific implementation form of the user equipment is not limited in this application.

The network device in FIG. 1 may be configured to implement functions such as a radio physical entity, resource scheduling and radio resource management, or radio access control and mobility management. For example, the network device may be a radio access network (RAN) device, for example, may be a base transceiver station (BTS) in a GSM system or a CDMA system, a NodeB (NB) in a WCDMA system, an evolved NodeB (eNB) in an LTE system, a radio controller in a cloud radio access network (C-RAN) scenario, a relay node station, a transmission reception point (TRP), an access point, a vehicle-mounted device, a road side unit (RSU), a wearable device, a network device in a 5G network such as an NR NodeB or a next generation NodeB (gNB), a centralized unit (CU), a distributed unit (DU), or a network device in a future evolved PLMN network. A specific implementation form of the network device is not limited in this application.

The relay device in FIG. 1 may be a communication device having a relay function. In addition to the relay function, the communication device may further have a normal communication function. For example, the relay function is specially used by the network device to perform relay communication with the user equipment, and serves the user equipment. The normal communication function is specially used by the network device to perform direct communication with the relay device, and serves the relay device. For example, the relay device may be cooperated user equipment (CUE) in a network assisted UE cooperation (NAUC) communication scenario. For another example, the relay device may be an JAB node in an integrated access and backhaul (JAB) communication scenario. For still another example, the relay device may be relay user equipment (relay UE).

Figure 2:
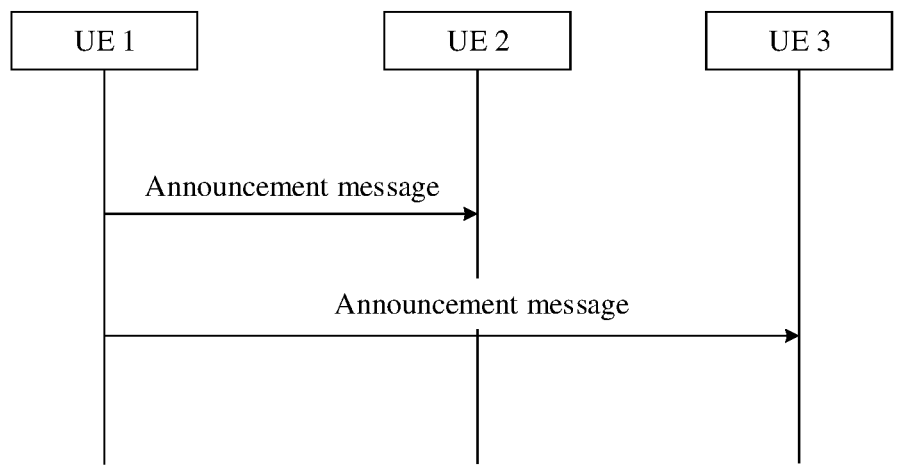
FIG. 2 is a schematic diagram of a communication method according to an embodiment of this application.
Figure 3:
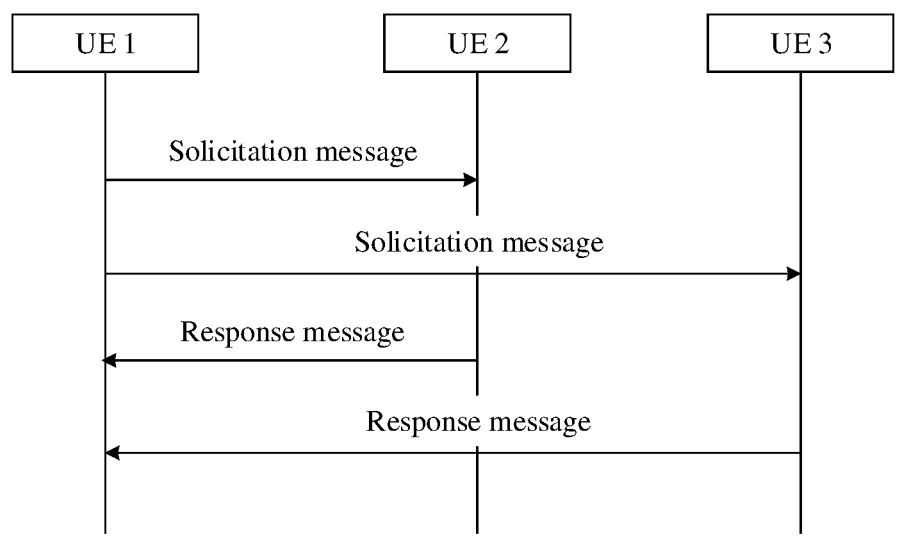
FIG. 3 is a schematic diagram of a communication method according to an embodiment of this application.

FIG. 2 and FIG. 3 show two relay device discovery methods according to this application. In the method shown in FIG. 2, user equipment actively broadcasts an announcement message, to notify nearby user equipment of existence of the user equipment.

In the method shown in FIG. 3, user equipment first broadcasts a solicitation message, and other user equipment that receives the solicitation message may reply with a response message to notify the user equipment of existence of the user equipment.

Figure 4:
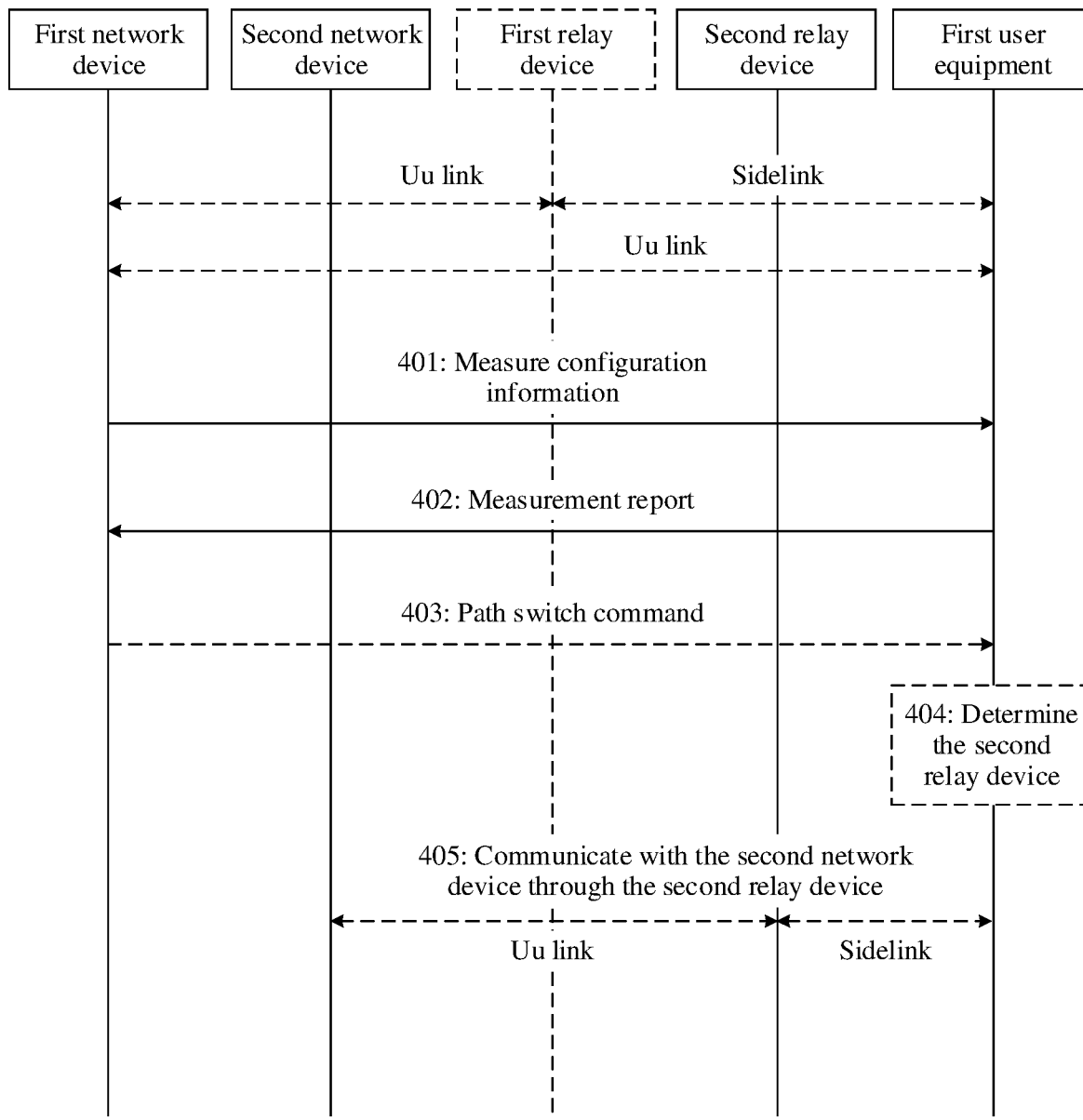
FIG. 4 is a schematic diagram of a communication method according to an embodiment of this application.

FIG. 4 shows a communication method according to an embodiment of this application. The communication method 400 includes the following steps.

Operation 401: A first network device sends first configuration information to first user equipment.

The first user equipment receives the first configuration information from the first network device, and obtains a first condition based on the first configuration information. In this application, if the first network device communicates with the first user equipment through a direct path, the first network device may send the first configuration information to the first user equipment through a Uu link. If the first network device communicates with the first user equipment through a first relay device, the first configuration information needs to be forwarded through the first relay device. The first configuration information in this application may be carried in an RRC message.

The first condition includes any one of the following: a reference signal measurement value corresponding to the first network device is less than or less than or equal to a first threshold; a reference signal measurement value corresponding to second user equipment is greater than or greater than or equal to a second threshold; a reference signal measurement value corresponding to the first network device is less than or less than or equal to a first threshold, and a reference signal measurement value corresponding to second user equipment is greater than or greater than or equal to a second threshold; a reference signal measurement value corresponding to second user equipment is greater than or greater than or equal to a sum of a reference signal measurement value corresponding to the first network device and a first offset; a reference signal measurement value corresponding to the first relay device is less than or less than or equal to a third threshold; a reference signal measurement value corresponding to the first relay device is less than or less than or equal to a third threshold, and a reference signal measurement value corresponding to second user equipment is greater than or greater than or equal to a fourth threshold; or a reference signal measurement value corresponding to second user equipment is greater than or greater than or equal to a sum of a reference signal measurement value corresponding to the first relay device and a second offset. In a first possible case, the first configuration information includes the first condition. Optionally, the first configuration information may further include first measurement object information.

In a second possible case, the first configuration information includes second measurement object information and a measurement event. The first user equipment obtains the first condition based on the second measurement object information and the measurement event. Optionally, the first condition may correspond to one measurement identifier.

The second measurement object information indicates the first user equipment to measure other user equipment. For example, the second measurement object information may specifically include frequency information. A frequency corresponding to the frequency information belongs to a PC5 interface operating frequency band. Optionally, the second measurement object information may specifically include at least one bit. A value of the at least one bit is a first value. The first value may be 0 or 1.

For example, the measurement event may include any one of the following: a reference signal measurement value corresponding to a current node (for example, a serving node, for example, the first network device or the first relay device) is less than or less than or equal to a first threshold; a reference signal measurement value (which may be a reference signal measurement value corresponding to other user equipment, another cell, or another carrier) is greater than or greater than or equal to a second threshold; a reference signal measurement value corresponding to a current node is less than or less than or equal to a first threshold, and a reference signal measurement value is greater than or greater than or equal to a second threshold; or a reference signal measurement value is greater than or greater than or equal to a sum of a reference signal measurement value corresponding to a current node and a first offset.

In the first possible case or the second possible case, the first or second measurement object information may include at least one of carrier information, a cell identifier, a user equipment identifier, and a network device identifier. When the first or second measurement object information includes the carrier information, a measurement object indicated by the first or second measurement object information is user equipment that works on a carrier corresponding to the carrier information. Alternatively, when the first or second measurement object information includes the cell identifier, a measurement object indicated by the first or second measurement object information is user equipment that camps on or is connected to a cell corresponding to the cell identifier. Alternatively, when the first or second measurement object information includes the user equipment identifier, a measurement object indicated by the first or second measurement object information is user equipment corresponding to the user equipment identifier. Alternatively, when the first or second measurement object information includes the network device identifier, a measurement object indicated by the first or second measurement object information is user equipment that camps on or is connected to a network device corresponding to the network device identifier. The first or second measurement object information may also be referred to as an allowlist.

In the first possible case or the second possible case, the first configuration information may include a blocklist. It should be understood that, when performing measurement, the first user equipment forbids, based on the blocklist, measuring an object belonging to the blocklist. For example, when the blocklist includes the cell identifier, the first user equipment is forbidden from measuring the user equipment that camps on or is connected to the cell corresponding to the cell identifier.

The cell identifier in this application may be a cell global identifier (CGI). An identifier of the user equipment may be a cell radio network temporary identifier (C-RNTI), an inactive radio network temporary identifier (I-RNTI), a 5G system architecture evolution temporary mobile subscription identifier (5G-S-TMSI), a layer 2 identifier (L2 ID), or a local index. The carrier information may be a carrier identifier or a carrier index. For example, the carrier index may indicate a corresponding carrier in a system information block (system information block) message sent by the first network device.

Operation 402: The first user equipment sends a measurement report to the first network device.

After receiving the first configuration information, the first user equipment may perform measurement based on the first configuration information. If the first condition is met, the first user equipment sends the measurement report (MR) to the first network device. It may also be understood as that when the first condition is met, the first user equipment is triggered to send the measurement report to a network.

Optionally, the first user equipment may measure a reference signal corresponding to the measurement object indicated by the first or second measurement object information. Optionally, the first user equipment may perform reporting based on the first or second measurement object information. For example, a reporting object included in the measurement report belongs to the object indicated by the first or second measurement object information.

Optionally, the measurement report includes identification information of at least one second user equipment, and/or a reference signal measurement value corresponding to the at least one second user equipment.

The reference signal measurement value in this application includes reference signal received power (RSRP), reference signal received quality (RSRQ), a signal to interference plus noise ratio (SINR), or a received signal strength indicator (RSSI).

A reference signal corresponding to the network device in this application may be a reference signal corresponding to a current serving cell of the first user equipment or a reference signal corresponding to a current operating carrier of the first user equipment. A reference signal corresponding to the first relay device or a reference signal corresponding to the second user equipment may be a discovery message, and the discovery message includes an announcement message or a response message. Optionally, the reference signal corresponding to the first relay device may alternatively be a data signal between the first user equipment and the first relay device. In other words, the first user equipment may alternatively obtain a measurement value of a reference signal between the first user equipment and the first relay device by measuring a data signal normally transmitted between the first user equipment and the first relay device.

For example, a specific measurement process of the reference signal corresponding to the second user equipment in this application may be as follows: The first user equipment sends a solicitation message; the first user equipment receives a response message from the second user equipment; and the first user equipment obtains a measurement value of the response message, and uses the measurement value as a reference signal measurement value corresponding to the second user equipment. Alternatively, the first user equipment receives an announcement message sent by second user equipment; and the first user equipment obtains a measurement value of the announcement message, and uses the measurement value as the reference signal measurement value corresponding to the second user equipment.

For example, in this application, when the first configuration information includes the first or second measurement object information, a specific measurement process may be as follows: The first user equipment sends a solicitation message, where the solicitation message includes the first or second measurement object information; the first user equipment receives a response message from a first or second measurement object, where optionally, in user equipments that receive the solicitation message, only user equipment belonging to the measurement object replies with the response message; and the first user equipment obtains or retains a measurement value of the response message, and uses the measurement value as a reference signal measurement value corresponding to the first or second measurement object.

Optionally, in this application, when the first configuration information includes the first or second measurement object information, a specific measurement process may be as follows: The first user equipment sends a solicitation message; the first user equipment receives a response message; and when user equipment that sends the response message belongs to a first or second measurement object, the first user equipment obtains or retains a measurement value of the response message, and uses the measurement value as a reference signal measurement value corresponding to the first or second measurement object.

Optionally, in this application, when the first configuration information includes the first or second measurement object information, a specific measurement process may be as follows: The first user equipment receives an announcement message; and when user equipment that sends the announcement message belongs to a first or second measurement object, the first user equipment obtains or retains a measurement value of the announcement message, and uses the measurement value as a reference signal measurement value corresponding to the first or second measurement object.

Optionally, this embodiment may further include the following operations 403 to 405.

Operation 403: The first network device sends a path switch command to the first user equipment.

After receiving the measurement report of the first user equipment, the first network device may send the path switch command (path switch command) to the first user equipment, where the path switch command may include identification information of X third user equipments, and X is a positive integer. The third user equipment may also be referred to as a candidate relay device.

For example, the first network device may select a reference signal measurement value with a maximum reference signal measurement value from reference signal measurement values included in the measurement report, and determine second user equipment corresponding to the maximum reference signal measurement value as the third user equipment. Alternatively, the first network device may select X reference signal measurement values greater than a preset threshold from reference signal measurement values included in the measurement report, and determine X second user equipments corresponding to the X reference signal measurement values as the X third user equipments.

For example, the first network device may select, from second user equipment identifiers included in the measurement report, a second user equipment identifier that ranks (ranking) first, and determine second user equipment corresponding to the second user equipment identifier that ranks first as the third user equipment. Alternatively, the first network device may select first X second user equipment identifiers from second user equipment identifiers included in the measurement report, and determine second user equipments corresponding to the first X second user equipment identifiers as the X third user equipments.

Operation 404: The first user equipment determines a second relay device.

When X is equal to 1, the first user equipment determines that the third user equipment is the second relay device.

When X is greater than 1, the first user equipment selects the second relay device from the third user equipments. For example, the first user equipment may select third user equipment with a best reference signal measurement value in the X third user equipments as the second relay device. The selection may be autonomous selection by the user equipment, or may be selection performed by the user equipment with assistance of indication information provided by the network device.

Operation 405: The first user equipment communicates with a second network device through the second relay device.

The second network device may be a network device on which the second relay device camps or to which the second relay device is connected.

The first user equipment may establish a sidelink connection to the second relay device. The first user equipment sends a path switch complete (path switch command complete) message to the first network device or the second network device through the second relay device, where the message is used to indicate that the first user equipment is successfully switched to the second network device.

It should be understood that, that the first user equipment establishes the sidelink connection to the second relay device may be that the first user equipment establishes a PC5-S connection to the second relay device by sending a direct communication request message.

It should be understood that the second network device and the first network device may be a same network device, or may be different network devices.

Figure 5:
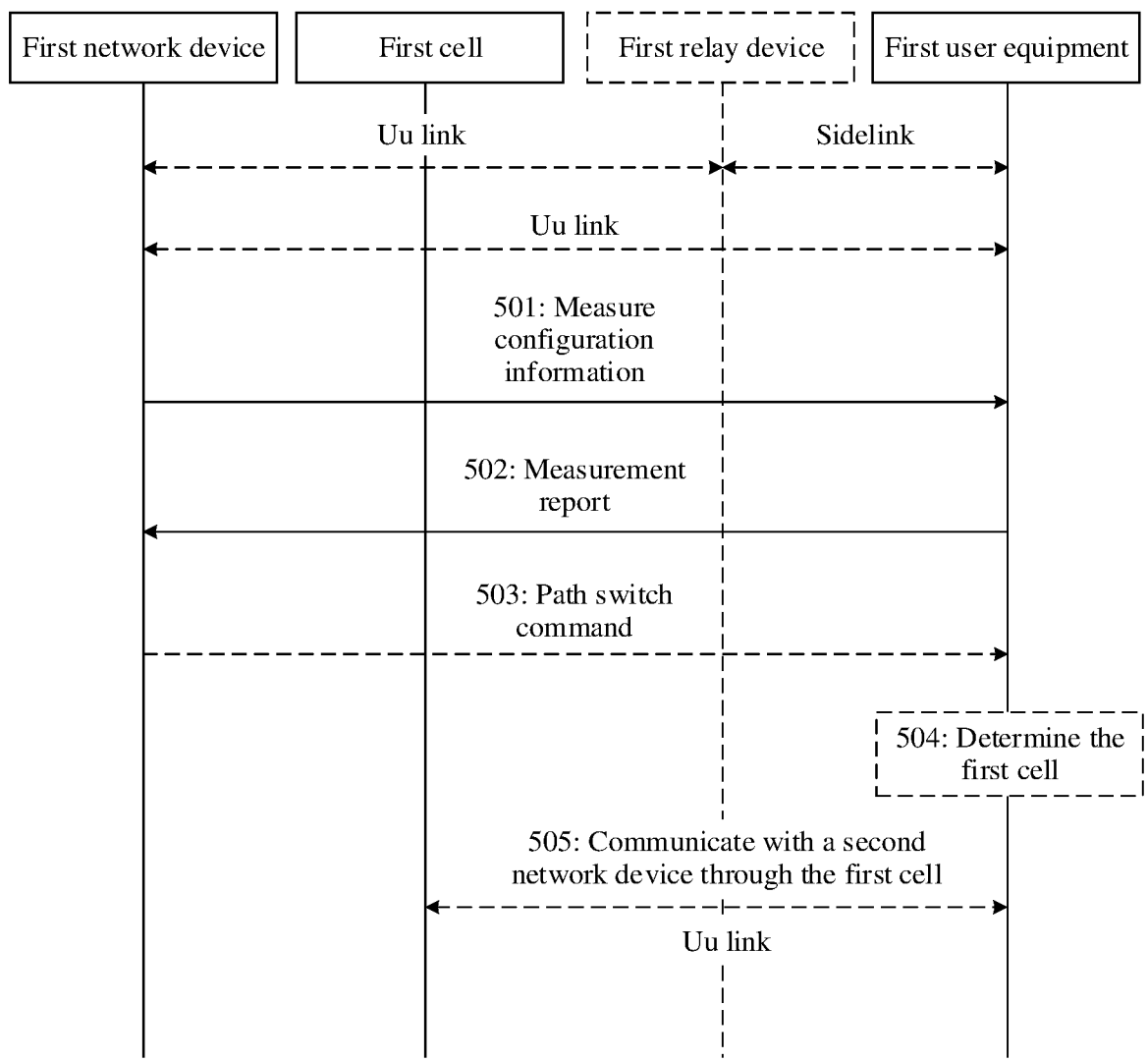
FIG. 5 is a schematic diagram of a communication method according to an embodiment of this application.

FIG. 5 shows a communication method according to an embodiment of this application. The communication method 500 includes the following steps.

Operation 501: A first network device sends first configuration information to first user equipment.

The first user equipment receives the first configuration information from the first network device, and obtains a second condition based on the first configuration information.

The second condition includes any one of the following: a reference signal measurement value corresponding to a serving cell is less than or less than or equal to a ninth threshold; a reference signal measurement value corresponding to another cell is greater than or greater than or equal to a tenth threshold; a reference signal measurement value corresponding to a serving cell is less than or less than or equal to a ninth threshold, and a reference signal measurement value corresponding to another cell is greater than or greater than or equal to a tenth threshold; a reference signal measurement value corresponding to another cell is greater than or greater than or equal to a sum of a reference signal measurement value corresponding to a serving cell and a fifth offset; a reference signal measurement value corresponding to a serving carrier is less than or less than or equal to a ninth threshold; a reference signal measurement value corresponding to another carrier is greater than or greater than or equal to a tenth threshold; a reference signal measurement value corresponding to a serving carrier is less than or less than or equal to a ninth threshold, and a reference signal measurement value corresponding to another carrier is greater than or greater than or equal to a tenth threshold; a reference signal measurement value corresponding to another carrier is greater than or greater than or equal to a sum of a reference signal measurement value corresponding to a serving carrier and a fifth offset; a reference signal measurement value corresponding to a first relay device is less than or less than or equal to an eleventh threshold; a reference signal measurement value corresponding to a first relay device is less than or less than or equal to an eleventh threshold, and a reference signal measurement value corresponding to a cell is greater than or greater than or equal to a twelfth threshold; a reference signal measurement value corresponding to a cell is greater than or greater than or equal to a sum of a reference signal measurement value corresponding to a first relay device and a sixth offset; a reference signal measurement value corresponding to a first relay device is less than or less than or equal to an eleventh threshold, and a reference signal measurement value corresponding to a carrier is greater than or greater than or equal to a twelfth threshold; or a reference signal measurement value corresponding to a carrier is greater than or greater than or equal to a sum of a reference signal measurement value corresponding to a first relay device and a sixth offset.

In a first possible case, the first configuration information includes the second condition. Optionally, the first configuration information may further include third measurement object information.

In a second possible case, the first configuration information includes fourth measurement object information and a measurement event. The first user equipment obtains the second condition based on the fourth measurement object information and the measurement event. The second condition may correspond to one measurement identifier.

The fourth measurement object information indicates the first user equipment to measure a cell or a carrier. For example, the fourth measurement object information may specifically include frequency information. A frequency corresponding to the frequency information may belong to a Uu interface operating frequency band. Optionally, the fourth measurement object information may specifically include at least one bit. A value of the at least one bit is a second value. The second value may be 0 or 1.

For example, the measurement event may include any one of the following: a reference signal measurement value corresponding to a current node (for example, a serving node, which may be the first network device or the first relay device) is less than or less than or equal to a first threshold; a reference signal measurement value (which may be a reference signal measurement value corresponding to other user equipment, another cell, or another carrier) is greater than or greater than or equal to a second threshold; a reference signal measurement value corresponding to a current node is less than or less than or equal to a first threshold, and a reference signal measurement value is greater than or greater than or equal to a second threshold; or a reference signal measurement value is greater than or greater than or equal to a sum of a reference signal measurement value corresponding to a current node and a first offset.

In the first possible case or the second possible case, the third or fourth measurement object information may include at least one of carrier information, a cell identifier, a user equipment identifier, and a network device identifier. When the third or fourth measurement object information includes the carrier information, a measurement object indicated by the third or fourth measurement object information is a carrier corresponding to the carrier information. Alternatively, when the third or fourth measurement object information includes the cell identifier, a measurement object indicated by the third or fourth measurement object information is a cell corresponding to the cell identifier. Alternatively, when the third or fourth measurement object information includes the user equipment identifier, a measurement object indicated by the third or fourth measurement object information is a cell in which user equipment corresponding to the user equipment identifier is located or a carrier on which user equipment corresponding to the user equipment identifier is located. Alternatively, when the third or fourth measurement object information includes the network device identifier, a measurement object indicated by the third or fourth measurement object information is a cell or a carrier served by a network device corresponding to the network device identifier. The third or fourth measurement object information may also be referred to as an allowlist.

In the first possible case or the second possible case, the first configuration information may include a blocklist. It should be understood that, when performing measurement, the first user equipment forbids, based on the blocklist, measuring an object belonging to the blocklist. For example, when the blocklist includes the cell identifier, the first user equipment is forbidden from measuring the cell corresponding to the cell identifier. When the blocklist includes a carrier identifier, the first user equipment is forbidden from measuring a carrier corresponding to the carrier identifier.

Operation 502: The first user equipment sends a measurement report to the first network device.

After receiving the first configuration information, the first user equipment may perform measurement based on the first configuration information. If the second condition is met, the first user equipment sends the measurement report to the first network device. It may also be understood as that when the second condition is met, the first user equipment is triggered to send the measurement report to a network.

Optionally, the first user equipment may measure a reference signal corresponding to the measurement object indicated by the third or fourth measurement object information. Optionally, the first user equipment may perform reporting based on the third or fourth measurement object information. For example, a reporting object included in the measurement report belongs to the object indicated by the third or fourth measurement object information.

Optionally, the measurement report includes identification information of at least one cell or at least one carrier, and/or a reference signal measurement value corresponding to the at least one cell or the at least one carrier.

Optionally, this embodiment may further include the following operations 503 to 505.

Operation 503: The first network device sends a path switch command to the first user equipment.

After receiving the measurement report of the first user equipment, the first network device may send the path switch command to the first user equipment, where the path switch command may include identification information of Y cells or Y carriers, and Y is a positive integer.

For example, the first network device may select a reference signal measurement value with a maximum reference signal measurement value from reference signal measurement values included in the measurement report, and determine a cell or a carrier corresponding to the maximum reference signal measurement value as the cell or the carrier included in the path switch command. Alternatively, the first network device may select Y reference signal measurement values greater than a preset threshold from reference signal measurement values included in the measurement report, and determine Y cells or Y carriers corresponding to the Y reference signal measurement values as the Y cells or the Y carriers included in the path switch command.

For example, the first network device may select, from cell identifiers or carrier identifiers included in the measurement report, a cell identifier or a carrier identifier that ranks (ranking) first, and determine a cell or a carrier corresponding to the cell identifier or the carrier identifier that ranks first as the cell or the carrier included in the path switch command. Alternatively, the first network device may select first Y cell identifiers or first Y carrier identifiers from cell identifiers or carrier identifiers included in the measurement report, and determine cells or carriers corresponding to the first Y cell identifiers or the first Y carrier identifiers as the Y cells or the Y carriers included in the path switch command.

Operation 504: The first user equipment determines a first cell or a first carrier.

When Y is equal to 1, the first user equipment determines that a cell included in the path switch command is the first cell, or determines that a carrier included in the path switch command is the first carrier.

When Y is greater than 1, the first user equipment selects the first cell from the Y cells, or selects the first carrier from the Y carriers. For example, the first user equipment may select a cell with a best reference signal measurement value in the Y cells as the first cell, or the first user equipment may select a carrier with a best reference signal measurement value in the Y carriers as the first carrier. The selection may be autonomous selection by the user equipment, or may be selection performed by the user equipment with assistance of indication information provided by the network device.

Operation 505: The first user equipment communicates with a second network device through the first cell, or communicates with a second network device through the first carrier.

The second network device may be a network device to which the first cell or the first carrier belongs.

Optionally, the first user equipment may initiate random access to the second network device, to attempt to access the second network device.

The first user equipment may further send a path switch command complete message to the first network device or the second network device, where the message is used to indicate that the first user equipment is successfully switched to the second network device.

The second network device and the first network device may be a same network device, or may be different network devices.

Figure 6:
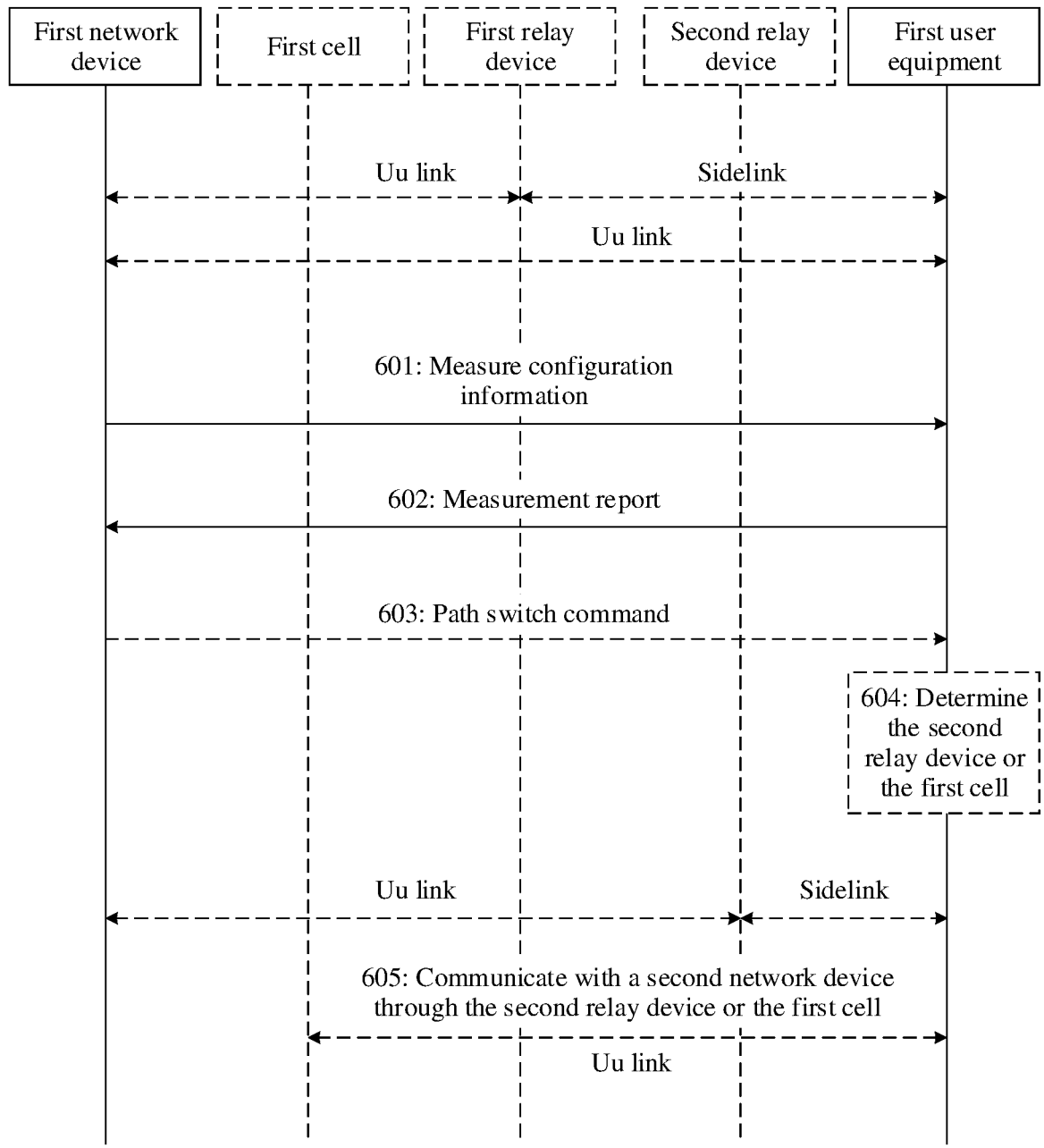
FIG. 6 is a schematic diagram of a communication method according to an embodiment of this application.

FIG. 6 shows a communication method according to an embodiment of this application. The communication method 600 includes the following steps.

Operation 601: A first network device sends first configuration information to first user equipment.

The first user equipment receives the first configuration information from the first network device, where the first configuration information includes a third condition.

The third condition may include: a reference signal measurement value corresponding to the first network device is less than or less than or equal to a seventeenth threshold; a reference signal measurement value corresponding to another device (user equipment or a network device) is greater than or greater than or equal to an eighteenth threshold; a reference signal measurement value corresponding to the first network device is less than or less than or equal to a seventeenth threshold, and a reference signal measurement value corresponding to another device (user equipment or a network device) is greater than or greater than or equal to an eighteenth threshold; a reference signal measurement value corresponding to another device (user equipment or a network device) is greater than or greater than or equal to a sum of a reference signal measurement value corresponding to the first network device and a ninth offset; a reference signal measurement value corresponding to a first relay device is less than or less than or equal to a nineteenth threshold; a reference signal measurement value corresponding to a first relay device is less than or less than or equal to a nineteenth threshold, and a reference signal measurement value corresponding to another device (user equipment or a network device) is greater than or greater than or equal to a twentieth threshold; or a reference signal measurement value corresponding to another device (user equipment or a network device) is greater than or greater than or equal to a sum of a reference signal measurement value corresponding to a first relay device and a tenth offset.

Optionally, the first configuration information may include fifth measurement object information. The fifth measurement object information may include at least one of carrier information, a cell identifier, a user equipment identifier, and a network device identifier. When the fifth measurement object information includes the carrier information, a measurement object indicated by the fifth measurement object information is a carrier corresponding to the carrier information and/or user equipment that works on the carrier. Alternatively, when the fifth measurement object information includes the cell identifier, a measurement object indicated by the fifth measurement object information is a cell corresponding to the cell identifier and/or user equipment in the cell. Alternatively, when the fifth measurement object information includes the user equipment identifier, a measurement object indicated by the fifth measurement object information is user equipment corresponding to the user equipment identifier. Alternatively, when the fifth measurement object information includes the network device identifier, a measurement object indicated by the fifth measurement object information is a network device corresponding to the network device identifier. The fifth measurement object information may also be referred to as an allowlist.

Optionally, the first configuration information may include a blocklist. It should be understood that, when performing measurement, the first user equipment forbids, based on the blocklist, measuring an object belonging to the blocklist. For example, when the blocklist includes the cell identifier, the first user equipment is forbidden from measuring the user equipment that camps on or is connected to the cell corresponding to the cell identifier, and/or measuring the cell corresponding to the cell identifier. For example, when the blocklist includes a carrier identifier, the first user equipment is forbidden from measuring user equipment that camps on or is connected to a carrier corresponding to the carrier identifier, and/or measuring the carrier corresponding to the carrier identifier. For example, when the blocklist includes the user equipment identifier, the first user equipment is forbidden from measuring the user equipment identifier. For example, when the blocklist includes the network device identifier, the first user equipment is forbidden from measuring the network device identifier.

Operation 602: The first user equipment sends a measurement report to the first network device.

After receiving the first configuration information, the first user equipment may perform measurement based on the first configuration information. If the third condition is met, the first user equipment sends the measurement report to the first network device. Optionally, the first user equipment may measure a reference signal corresponding to the measurement object indicated by the fifth measurement object information. Optionally, the first user equipment may perform reporting based on the fifth measurement object information. For example, a reporting object included in the measurement report belongs to the object indicated by the fifth measurement object information.

Optionally, the measurement report includes at least one of the following: identification information of at least one second user equipment, a reference signal measurement value corresponding to at least one second user equipment, identification information of at least one cell or at least one carrier, or a reference signal measurement value corresponding to at least one cell or at least one carrier.

Optionally, this embodiment may further include the following operations 603 to 605.

Operation 603: The first network device sends a path switch command to the first user equipment.

After receiving the measurement report of the first user equipment, the first network device may send a path switch command to the first user equipment, where the path switch command may include identification information of Y third user equipments, and Y is a positive integer; or the path switch command may include identification information of Y cells; or the path switch command may include identification information of Y carriers, and Y is a positive integer.

For example, the first network device may select a reference signal measurement value with a maximum reference signal measurement value from reference signal measurement values included in the measurement report, and determine second user equipment, a cell, or a carrier corresponding to the maximum reference signal measurement value as the third user equipment, the cell, or the carrier included in the path switch command. Alternatively, the first network device may select Y reference signal measurement values greater than a preset threshold from reference signal measurement values included in the measurement report, and determine Y second user equipments, Y cells, or Y carriers corresponding to the Y reference signal measurement values as the Y third user equipments, the Y cells, or the Y carriers included in the path switch command.

For example, the first network device may select, from second user equipment identifiers, cell identifiers, or carrier identifiers included in the measurement report, a second user equipment identifier, a cell identifier, or a carrier identifier that ranks (ranking) first, and determine second user equipment, a cell, or a carrier corresponding to the second user equipment identifier, the cell identifier, or the carrier identifier that ranks first as the third user equipment, the cell, or the carrier included in the path switch command. Alternatively, the first network device may select first Y second user equipment identifiers, first Y cell identifiers, or first Y carrier identifiers from second user equipment identifiers, cell identifiers, or carrier identifiers included in the measurement report, and determine second user equipments, cells or carriers corresponding to the first Y second user equipment identifiers, the first Y cell identifiers, or the first Y carrier identifiers as the Y third user equipments, the Y cells, or the Y carriers included in the path switch command.

Operation 604: The first user equipment determines a second relay device, a first cell, or a first carrier.

When the path switch command includes the identification information of the Y third user equipments, the following descriptions are provided.

When Y is equal to 1, the first user equipment determines that the third user equipment is the second relay device.

When Y is greater than 1, the first user equipment selects the second relay device from the third user equipments. For example, the first user equipment may select third user equipment with a best reference signal measurement value in the Y third user equipments as the second relay device. The selection may be autonomous selection by the user equipment, or may be selection performed by the user equipment with assistance of indication information provided by the network device.

When the path switch command includes the identification information of the Y cells or the Y carriers, the following descriptions are provided.

When Y is equal to 1, the first user equipment determines that a cell included in the path switch command is the first cell, or determines that a carrier included in the path switch command is the first carrier.

When Y is greater than 1, the first user equipment selects the first cell from the Y cells, or selects the first carrier from the Y carriers. For example, the first user equipment may select a cell with a best reference signal measurement value in the Y cells as the first cell, or the first user equipment may select a carrier with a best reference signal measurement value in the Y carriers as the first carrier. The selection may be autonomous selection by the user equipment, or may be selection performed by the user equipment with assistance of indication information provided by the network device.

Operation 605: The first user equipment communicates with a second network device through the second relay device, or communicates with a second network device through the first cell, or communicates with a second network device through the first carrier.

For operation 605, refer to the descriptions of operation 405 or 505. Details are not described herein again.

A path switching method is provided in each of the methods 400 to 600. The first user equipment may separately obtain the first condition, the second condition, or the third condition based on the first configuration information from the first network device. The terminal device reports the measurement report based on the first condition, the second condition, or the third condition. According to the methods 400 to 600, the measurement report in a relay scenario can be appropriately reported.

The methods 400 to 600 may further include: The first network device determines a candidate path switch target (which may be a network device, a cell, a carrier, or user equipment) based on the measurement report reported by the first user equipment, and delivers the candidate path switch target to the first user equipment by using the path switch command. The first user equipment determines a final path switch target based on the path switch command, and attempts to access the final path switch target. Alternatively, the first network device may provide only one candidate path switch target. In this way, the first user equipment may directly determine the candidate path switch target as the final path switch target.

In the method 400, there are two possible cases. In the first possible case, the first configuration information directly includes the first condition. In this way, air interface overheads are reduced. Optionally, the first configuration information may further include the first measurement object information. In the second possible case, the first configuration information includes the second measurement object information and the measurement event, and the first condition is obtained by the first user equipment based on the second measurement object information and the measurement event. In this way, when the first condition needs to be updated, the network device may update only the second measurement object information or the measurement event, to improve efficiency of updating or modifying the first condition. In the method 500, there are also two possible cases. In the first possible case, the first configuration information directly includes the second condition. In this way, air interface overheads are reduced. Optionally, the first configuration information may further include the third measurement object information. In the second possible case, the first configuration information includes the fourth measurement object information and the measurement event, and the second condition is obtained by the first user equipment based on the fourth measurement object information and the measurement event. In this way, when the second condition needs to be updated, the network device may update only the fourth measurement object information or the measurement event, to improve efficiency of updating or modifying the second condition. In the method 600, the first configuration information directly includes the third condition. Optionally, the first configuration information may further include the fifth measurement object information.

In addition, the first to fifth measurement object information may specifically include at least one of the carrier information, the cell identifier, the user equipment identifier, and the network device identifier. Optionally, the first configuration information may include the blocklist. Configurations of the first to the fifth measurement object information and/or the blocklist can greatly improve measurement efficiency of the user equipment.

Figure 7:
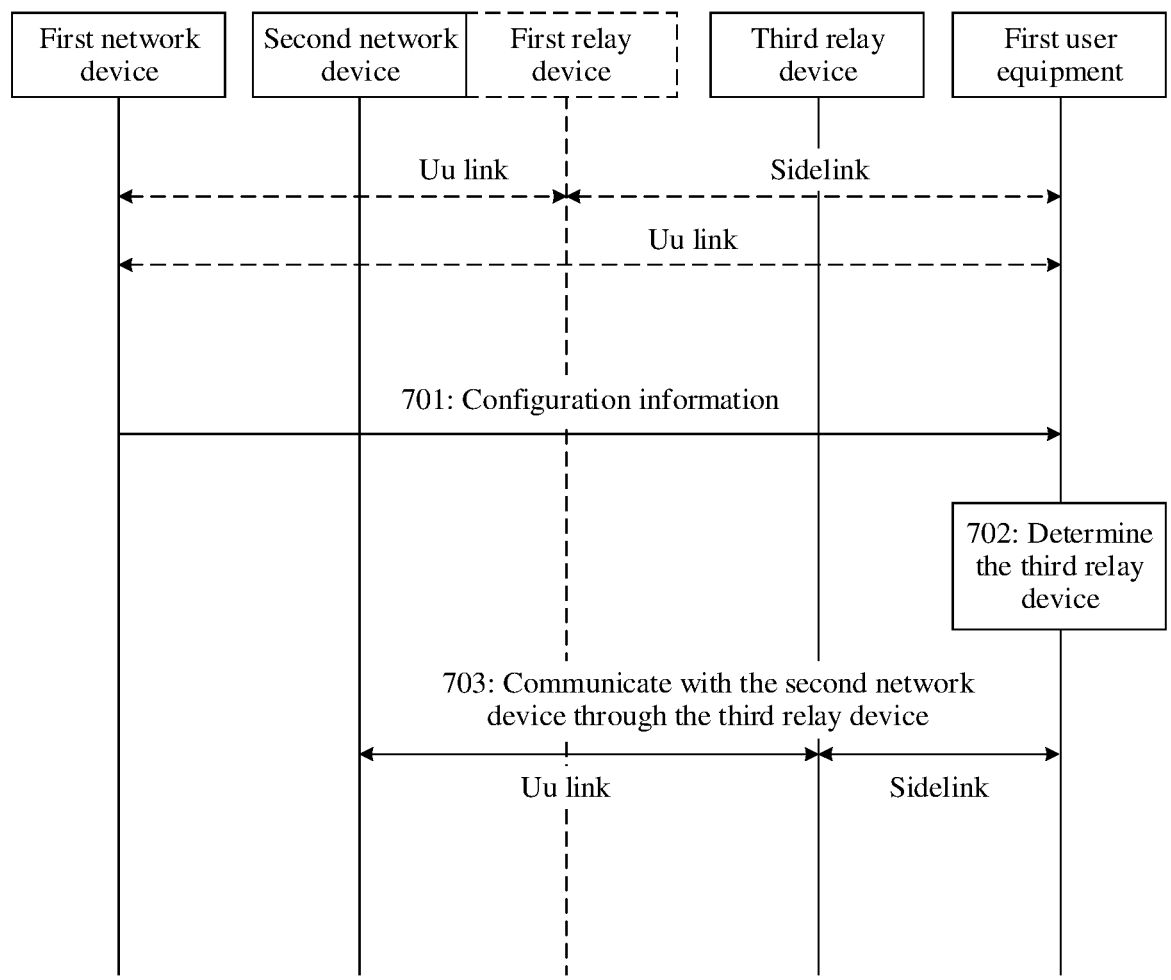
FIG. 7 is a schematic diagram of a communication method according to an embodiment of this application.

FIG. 7 shows a communication method according to an embodiment of this application. The communication method 700 includes the following steps.

Operation 701: A first network device sends second configuration information to first user equipment.

The first user equipment receives the second configuration information from the network device, and obtains a fourth condition based on the second configuration information.

The first user equipment determines fourth user equipment that meets the fourth condition. For example, when a reference signal measurement value corresponding to the first network device is less than or less than or equal to a preset threshold, the first user equipment starts to determine the fourth user equipment that meets the fourth condition.

In this application, if the network device communicates with the first user equipment through a direct path, the network device may send the second configuration information to the first user equipment a Uu link. If the network device communicates with the first user equipment through a first relay device, the second configuration information needs to be forwarded through the first relay device. The second configuration information in this application may be carried in an RRC message.

The fourth user equipment that meets the fourth condition includes any one of the following: a reference signal measurement value corresponding to the fourth user equipment is greater than or greater than or equal to a fifth threshold; a reference signal measurement value corresponding to the first network device is less than or less than or equal to a fifth threshold, and a reference signal measurement value corresponding to the fourth user equipment is greater than or greater than or equal to a sixth threshold; a reference signal measurement value corresponding to the fourth user equipment is greater than or greater than or equal to a sum of a reference signal measurement value corresponding to the first network device and a third offset; a reference signal measurement value corresponding to the first relay device is less than or less than or equal to a third threshold, and a reference signal measurement value corresponding to the fourth user equipment is greater than or greater than or equal to an eighth threshold; or a reference signal measurement value corresponding to the fourth user equipment is greater than or greater than or equal to a sum of a reference signal measurement value corresponding to a first relay device and a fourth offset.

In a first possible case, the second configuration information includes the fourth condition. Optionally, the second configuration information may further include sixth measurement object information.

In a second possible case, the second configuration information includes seventh measurement object information and a measurement event. The first user equipment obtains the fourth condition based on the seventh measurement object information and the measurement event.

The seventh measurement object information indicates the first user equipment to measure other user equipment. For example, the seventh measurement object information may specifically include frequency information. A frequency corresponding to the frequency information belongs to a PC5 interface operating frequency band. Optionally, the seventh measurement object information may specifically include at least one bit. A value of the at least one bit is a first value. The first value may be 0.

For example, the measurement event may include any one of the following: a reference signal measurement value corresponding to other user equipment, another cell, or another carrier is greater than or greater than or equal to a fourth threshold; a reference signal measurement value corresponding to a current node (a serving node, for example, the first network device or the first relay device) is less than or less than or equal to a third threshold, and a reference signal measurement value corresponding to other user equipment, another cell, or another carrier is greater than or greater than or equal to a fourth threshold; or a reference signal measurement value corresponding to other user equipment, another cell, or another carrier is greater than or greater than or equal to a sum of a reference signal measurement value corresponding to a current node (a serving node, for example, the network device or the relay device) and a second offset.

In the first possible case or the second possible case, the sixth or seventh measurement object information may include at least one of carrier information, a cell identifier, a user equipment identifier, and a network device identifier. When the sixth or seventh measurement object information includes the carrier information, a measurement object indicated by the sixth or seventh measurement object information is user equipment that works on a carrier corresponding to the carrier information. Alternatively, when the sixth or seventh measurement object information includes the cell identifier, a measurement object indicated by the sixth or seventh measurement object information is user equipment that camps on or is connected to a cell corresponding to the cell identifier. Alternatively, when the sixth or seventh measurement object information includes the user equipment identifier, a measurement object indicated by the sixth or seventh measurement object information is user equipment corresponding to the user equipment identifier. Alternatively, when the sixth or seventh measurement object information includes the network device identifier, a measurement object indicated by the sixth or seventh measurement object information is user equipment that camps on or is connected to a network device corresponding to the network device identifier. The sixth or seventh measurement object information may also be referred to as an allowlist.

In the first possible case or the second possible case, the second configuration information may include a blocklist. It should be understood that, when performing measurement, the first user equipment forbids, based on the blocklist, measuring an object belonging to the blocklist. For example, when the blocklist includes the cell identifier, the first user equipment is forbidden from measuring the user equipment that camps on or is connected to the cell corresponding to the cell identifier.

Operation 702: The first user equipment determines a third relay device.

After receiving the second configuration information, the first user equipment may perform measurement based on the second configuration information. For example, when the fourth user equipment that meets the fourth condition exists, the first user equipment may start to perform path switching. Optionally, the first user equipment may measure the user equipment indicated by the sixth or seventh measurement object information.

The first user equipment determines, based on a measurement result, Y fourth user equipments that meet the fourth condition, where Y is a positive integer.

The first user equipment determines the third relay device in the Y fourth user equipments that meet the fourth condition. For example, the first user equipment may determine fourth user equipment with a best reference signal measurement value in the Y fourth user equipments as the third relay device. The determining may be autonomous determining by the user equipment, or may be determining performed by the user equipment with assistance of indication information provided by the network device.

Operation 703: The first user equipment communicates with a second network device through the third relay device.

The second network device may be a network device on which the third relay device camps or to which the third relay device is connected.

The first user equipment may establish a sidelink connection to the third relay device. The first user equipment sends a path switch notification message to the first network device or the second network device through the third relay device. The path switch notification information may include an identifier of the third relay device, and optionally further includes an identifier of a cell on which the third relay device camps or to which the third relay device is connected.

The path switch notification message may enable the first network device and the second network device to exchange data information (for example, a data packet sequence number) of the first user equipment, to ensure service continuity during path switching.

It should be understood that, that the first user equipment establishes the sidelink connection to the third relay device may be that the first user equipment establishes a PC5-S connection to the third relay device by sending a direct communication request message.

It should be understood that the second network device and the first network device may be a same network device, or may be different network devices.

Figure 8:
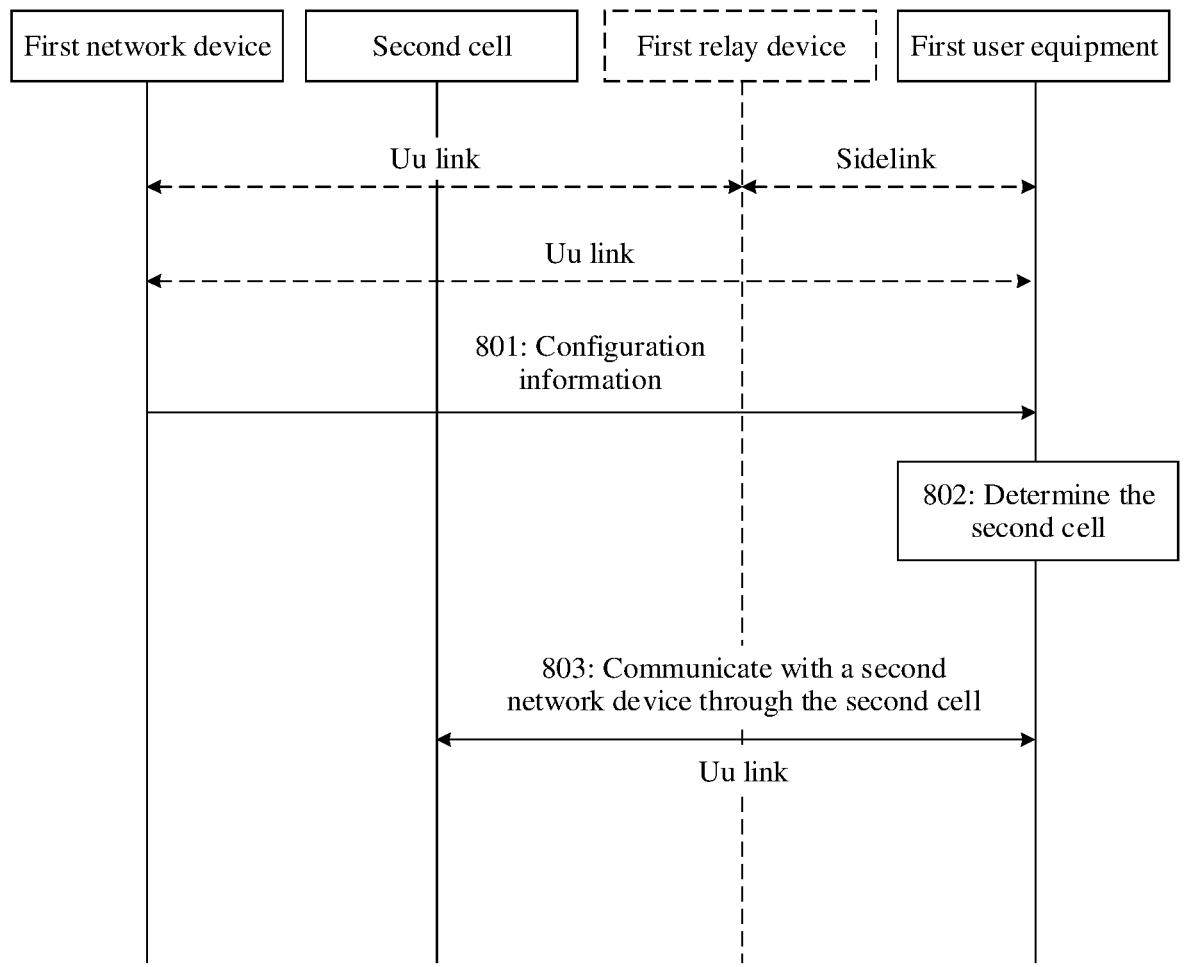
FIG. 8 is a schematic diagram of a communication method according to an embodiment of this application.

FIG. 8 shows a communication method according to an embodiment of this application. The communication method 800 includes the following steps.

Operation 801: A first network device sends second configuration information to first user equipment.

The first user equipment receives the second configuration information from the first network device, and obtains a fifth condition based on the second configuration information.

The first user equipment determines a cell or a carrier that meets the fifth condition. For example, when a reference signal measurement value corresponding to the first network device is less than or less than or equal to a preset threshold, the first user equipment starts to determine the cell or the carrier that meets the fifth condition.

The cell that meets the fifth condition includes any one of the following: a reference signal measurement value corresponding to the cell is greater than or greater than or equal to a thirteenth threshold; a reference signal measurement value corresponding to a first relay device is less than or less than or equal to a sixteenth threshold, and a reference signal measurement value corresponding to the cell is greater than or greater than or equal to a fifteenth threshold; or a reference signal measurement value corresponding to the cell is greater than or greater than or equal to a sum of a reference signal measurement value corresponding to a first relay device and an eighth offset.

The carrier that meets the fifth condition includes any one of the following: a reference signal measurement value corresponding to the carrier is greater than or greater than or equal to a thirteenth threshold; a reference signal measurement value corresponding to a serving carrier is less than or less than or equal to a fourteenth threshold, and a reference signal measurement value corresponding to the carrier is greater than or greater than or equal to a thirteenth threshold; a reference signal measurement value corresponding to the carrier is greater than or greater than or equal to a sum of a reference signal measurement value corresponding to a serving carrier and a seventh offset; a reference signal measurement value corresponding to a first relay device is less than or less than or equal to a sixteenth threshold, and a reference signal measurement value corresponding to the carrier is greater than or greater than or equal to a fifteenth threshold; or a reference signal measurement value corresponding to the carrier is greater than or greater than or equal to a sum of a reference signal measurement value corresponding to a first relay device and an eighth offset.

In a first possible case, the second configuration information includes the fifth condition. Optionally, the second configuration information further includes eighth measurement object information.

In a second possible case, the second configuration information may include ninth measurement object information and a measurement event. The first user equipment obtains the fifth condition based on the ninth measurement object information and the measurement event.

The ninth measurement object information indicates the first user equipment to measure a cell or a carrier. For example, the ninth measurement object information may specifically include frequency information. A frequency corresponding to the frequency information may belong to a Uu interface operating frequency band. Optionally, the ninth measurement object information may specifically include at least one bit. A value of the at least one bit is a second value.

For example, the measurement event may include any one of the following: a reference signal measurement value corresponding to a current node (for example, a serving node, which may be the first network device or the first relay device) is less than or less than or equal to a first threshold; a reference signal measurement value corresponding to other user equipment, another cell, or another carrier is greater than or greater than or equal to a second threshold; a reference signal measurement value corresponding to a current node is less than or less than or equal to a first threshold, and a reference signal measurement value corresponding to other user equipment, another cell, or another carrier is greater than or greater than or equal to a second threshold; or a reference signal measurement value corresponding to other user equipment, another cell, or another carrier is greater than or greater than or equal to a sum of a reference signal measurement value corresponding to a current node and a first offset.

In the first possible case or the second possible case, the eighth or ninth measurement object information may include at least one of carrier information, a cell identifier, a user equipment identifier, and a network device identifier. When the eighth or ninth measurement object information includes the carrier information, a measurement object indicated by the eighth or ninth measurement object information is a carrier corresponding to the carrier information. Alternatively, when the eighth or ninth measurement object information includes the cell identifier, a measurement object indicated by the eighth or ninth measurement object information is a cell corresponding to the cell identifier. Alternatively, when the eighth or ninth measurement object information includes the user equipment identifier, a measurement object indicated by the eighth or ninth measurement object information is a cell in which user equipment corresponding to the user equipment identifier is located or a carrier on which user equipment corresponding to the user equipment identifier is located. Alternatively, when the eighth or ninth measurement object information includes the network device identifier, a measurement object indicated by the eighth or ninth measurement object information is a cell or a carrier served by a network device corresponding to the network device identifier. The eighth or ninth measurement object information may also be referred to as an allowlist.

In the first possible case or the second possible case, the second configuration information may include a blocklist. It should be understood that, when performing measurement, the first user equipment forbids, based on the blocklist, measuring an object belonging to the blocklist. For example, when the blocklist includes the cell identifier, the first user equipment is forbidden from measuring the cell corresponding to the cell identifier. When the blocklist includes a carrier identifier, the first user equipment is forbidden from measuring a carrier corresponding to the carrier identifier.

Operation 802: The first user equipment determines a second cell or a second carrier.

After receiving the second configuration information configuration, the first user equipment may perform measurement based on the second configuration information. For example, when the cell or the carrier that meets the fifth condition exists, the first user equipment may start to perform path switching. Optionally, the first user equipment may measure the cell or the carrier indicated by the eighth or ninth measurement object information.

The first user equipment determines, based on a measurement result, Y cells or Y carriers that meet the fifth condition, where Y is a positive integer.

The first user equipment determines the second cell or the second carrier in the Y cells or the Y carriers that meet the fifth condition.

For example, the first user equipment may determine a cell or a carrier with a best reference signal measurement value in the Y cells or the Y carriers as the second cell or the second carrier. The determining may be autonomous determining by the user equipment, or may be determining performed by the user equipment with assistance of indication information provided by the network device.

Operation 803: The first user equipment communicates with a second network device in the second cell, or communicates with a second network device on the second carrier.

The second network device may be a network device to which the second cell or the second carrier belongs.

Optionally, the first user equipment may initiate random access to the second network device, to attempt to access the second network device.

The first user equipment may further send a path switch notification message to the first network device or the second network device. The path switch notification information may include an identifier of a third relay device, and optionally further includes an identifier of a cell on which the third relay device camps or to which the third relay device is connected.

The second network device and the first network device may be a same network device, or may be different network devices.

Figure 9:
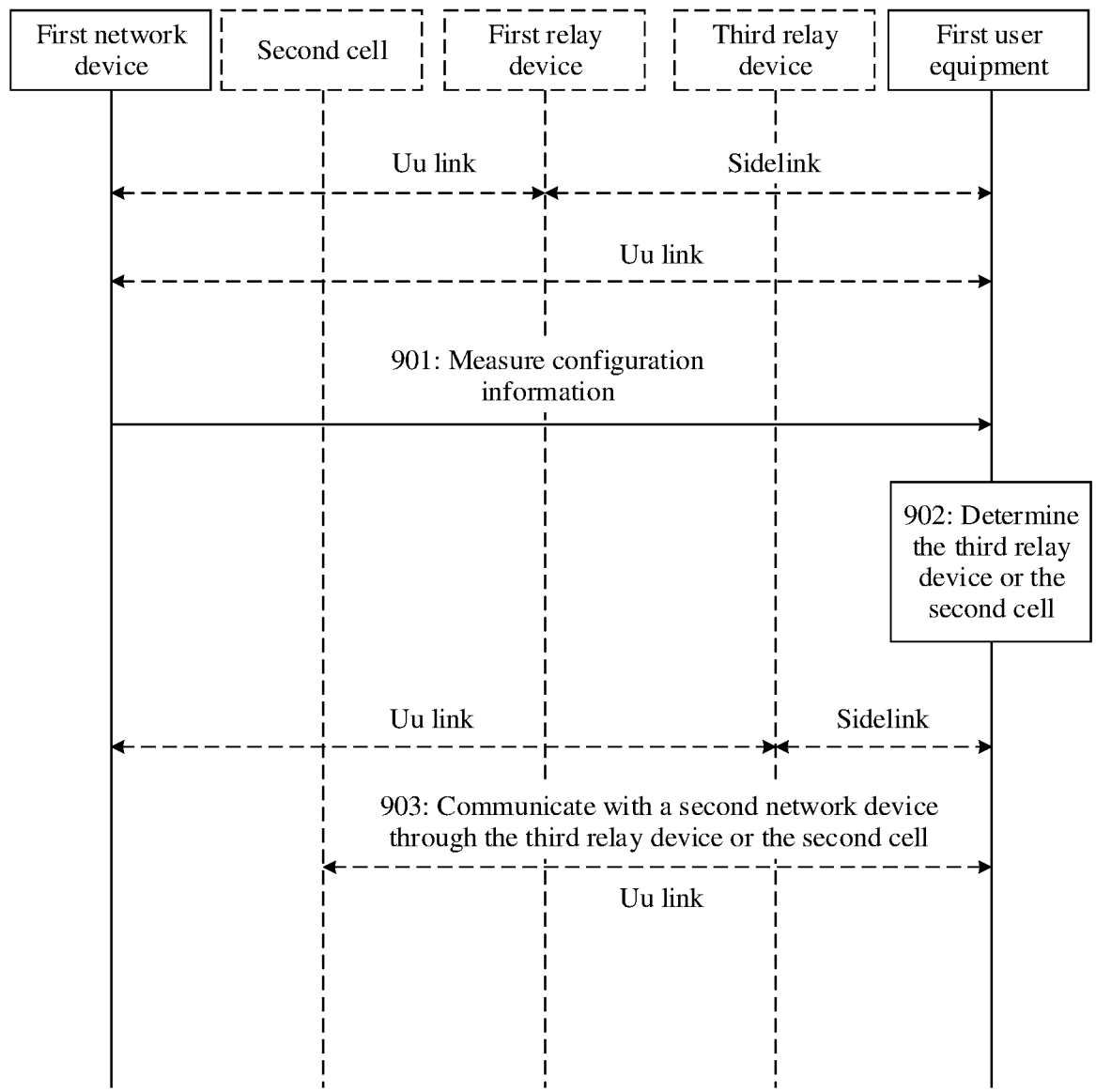
FIG. 9 is a schematic diagram of a communication method according to an embodiment of this application.

FIG. 9 shows a communication method according to an embodiment of this application. The communication method 900 includes the following steps.

Operation 901: A first network device sends second configuration information to first user equipment.

The first user equipment receives the second configuration information from the first network device, where the second configuration information includes a sixth condition.

The first user equipment determines fourth user equipment, a cell, or a carrier that meets the sixth condition. For example, when a reference signal measurement value corresponding to the first network device is less than or less than or equal to a preset threshold, the first user equipment starts to determine the fourth user equipment, the cell, or the carrier that meets the sixth condition.

The fourth user equipment, the cell, or the carrier that meets the sixth condition includes any one of the following: a reference signal measurement value corresponding to the user equipment, the cell, or the carrier is greater than or greater than or equal to a twenty-first threshold; a reference signal measurement value corresponding to the first network device is less than or less than or equal to a twenty-second threshold, and a reference signal measurement value corresponding to the user equipment, the cell, or the carrier is greater than or greater than or equal to a twenty-first threshold; a reference signal measurement value corresponding to the user equipment, the cell, or the carrier is greater than or greater than or equal to a sum of a reference signal measurement value corresponding to the network device and an eleventh offset; a reference signal measurement value corresponding to a first relay device is less than or less than or equal to a twenty-fourth threshold, and a reference signal measurement value corresponding to the user equipment, the cell, or the carrier is greater than or greater than or equal to a twenty-third threshold; or a reference signal measurement value corresponding to the user equipment, the cell, or the carrier is greater than or greater than or equal to a sum of a reference signal measurement value corresponding to a first relay device and a twelfth offset.

Optionally, the second configuration information may include tenth measurement object information. The tenth measurement object information may include at least one of carrier information, a cell identifier, a user equipment identifier, and a network device identifier. When the tenth measurement object information includes the carrier information, a measurement object indicated by the tenth measurement object information is a carrier corresponding to the carrier information and/or user equipment that works on the carrier. Alternatively, when the tenth measurement object information includes the cell identifier, a measurement object indicated by the tenth measurement object information is a cell corresponding to the cell identifier and/or user equipment in the cell. Alternatively, when the tenth measurement object information includes the user equipment identifier, a measurement object indicated by the tenth measurement object information is user equipment corresponding to the user equipment identifier. Alternatively, when the tenth measurement object information includes the network device identifier, a measurement object indicated by the tenth measurement object information is a network device corresponding to the network device identifier. The tenth measurement object information may also be referred to as an allowlist.

Optionally, the second configuration information may include a blocklist. It should be understood that, when performing measurement, the first user equipment forbids, based on the blocklist, measuring an object belonging to the blocklist. For example, when the blocklist includes the cell identifier, the first user equipment is forbidden from measuring the user equipment that camps on or is connected to the cell corresponding to the cell identifier, and/or measuring the cell corresponding to the cell identifier. For example, when the blocklist includes a carrier identifier, the first user equipment is forbidden from measuring user equipment that camps on or is connected to a carrier corresponding to the carrier identifier, and/or measuring the carrier corresponding to the carrier identifier. For example, when the blocklist includes the user equipment identifier, the first user equipment is forbidden from measuring the user equipment identifier. For example, when the blocklist includes the network device identifier, the first user equipment is forbidden from measuring the network device identifier.

Operation 902: The first user equipment determines a third relay device, a second cell, or a second carrier.

After receiving the second configuration information, the first user equipment may perform measurement based on the second configuration information. For example, when the fourth user equipment, the cell, or the carrier that meets the sixth condition exists, the first user equipment may start to perform path switching. Optionally, the first user equipment may measure the user equipment, the cell, or the carrier indicated by the tenth measurement object information.

The first user equipment determines, based on a measurement result, Y fourth user equipments, Y cells, or Y carriers that meet the sixth condition, where Y is a positive integer.

The first user equipment determines the third relay device, the second cell, or the second carrier in the Y fourth user equipments and/or the Y cells and/or the Y carriers that meet the sixth condition. For example, the first user equipment may determine that fourth user equipment, a cell, or a carrier with a best reference signal measurement value in the Y fourth user equipments and/or the Y cells and/or the Y carriers is the third relay device, the second cell, or the second carrier. The determining may be autonomous determining by the user equipment, or may be determining performed by the user equipment with assistance of indication information provided by the network device.

Operation 903: The first user equipment communicates with a network device through the third relay device, or communicates with a network device in the second cell, or communicates with a network device on the second carrier.

For operation 903, refer to the descriptions of operation 703 or 803. Details are not described herein again.

A path switching method is provided in each of the methods 700 to 900. The first user equipment may separately obtain the fourth condition, the fifth condition, or the sixth condition based on the second configuration information from the first network device. The terminal device determines a path switch target (which may be the network device, the cell, the carrier, or the user equipment) that meets the fourth condition, the fifth condition, or the sixth condition, and autonomously determines to perform path switching on the target.

In the method 700, there are two possible cases. In the first possible case, the second configuration information directly includes the fourth condition. In this way, air interface overheads are reduced. Optionally, the second configuration information may further include the sixth measurement object information. In the second possible case, the second configuration information includes the seventh measurement object information and the measurement event, and the fourth condition is obtained by the first user equipment based on the seventh measurement object information and the measurement event. In this way, when the fourth condition needs to be updated, the network device may update only the seventh measurement object information or the measurement event, to improve efficiency of updating or modifying the fourth condition. In the method 800, there are also two possible cases. In the first possible case, the second configuration information directly includes the fifth condition. In this way, air interface overheads are reduced. Optionally, the second configuration information may further include the eighth measurement object information. In the second possible case, the second configuration information includes the ninth measurement object information and the measurement event, and the fifth condition is obtained by the first user equipment based on the ninth measurement object information and the measurement event. In this way, when the fifth condition needs to be updated, the network device may update only the ninth measurement object information or the measurement event, to improve efficiency of updating or modifying the fifth condition. In the method 900, the second configuration information directly includes the sixth condition. Optionally, the second configuration information may further include the tenth measurement object information.

In addition, the sixth to tenth measurement object information may specifically include at least one of the carrier information, the cell identifier, the user equipment identifier, and the network device identifier. Optionally, the second configuration information may include the blocklist. Configurations of the sixth to tenth measurement object information and/or the blocklist can greatly improve measurement efficiency of the user equipment.

Based on a technical concept similar to the foregoing technical concept, an embodiment of this application provides a communication device. The communication device may be the relay device, the network device, or the user equipment in the communication method and any possible design of the communication method provided in any one of the foregoing embodiments. The relay device, the network device, or the user equipment may include at least one corresponding unit configured to perform a method step, an operation, or behavior performed by the relay device, the network device, or the user equipment in the communication method provided in any one of the foregoing embodiments. The at least one unit may be disposed in a one-to-one correspondence with the method step, the operation, or the behavior performed by the relay device, the network device, or the user equipment.

The following uses Embodiment 400 as an example to describe a specific communication device in detail. A communication device corresponding to another embodiment is not described again.

Figure 10:
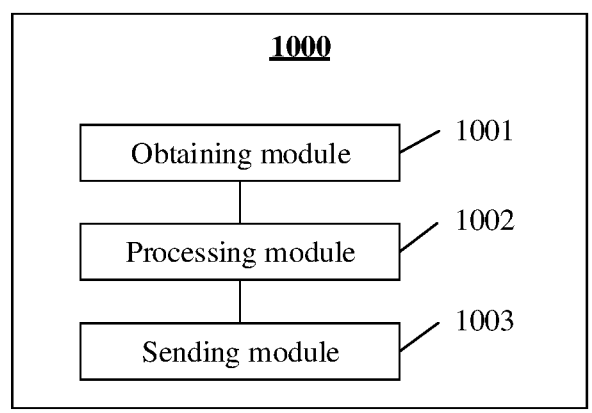
FIG. 10 is a schematic block diagram of a communication apparatus according to an embodiment of this application.

FIG. 10 is a schematic block diagram of a communication apparatus 1000 according to an embodiment of this application. The following specifically describes a structure and a function of the communication apparatus 1000 with reference to FIG. 10.

The communication apparatus 1000 may include: an obtaining module 1001, configured to receive first configuration information from a first network device; a processing module 1002, configured to obtain a first condition based on the first configuration information; and a sending module 1003, configured to send a measurement report to the first network device when the first condition is met, where the obtaining module 1001 is further configured to receive a path switch command from the first network device, where the path switch command may include identification information of X third user equipments, and X is a positive integer; and the processing module 1002 is further configured to: determine a second relay device in the X third user equipments, and communicate with a second network device through the second relay device.

That the processing module 1002 determines a second relay device in the X third user equipments may include: When X is equal to 1, the processing module 1002 determines that the third user equipment is the second relay device; or when X is greater than 1, the processing module 1002 selects the second relay device from the third user equipment.

For example, that the obtaining module 1001 receives first configuration information from a first network device may include: The obtaining module 1001 receives the first configuration information through a wireless communication link between the obtaining module 1001 and the first network device; or the obtaining module 1001 receives the first configuration information from the first network device through a first relay device.

The first condition may include any one of the following: a reference signal measurement value corresponding to the first network device is less than or less than or equal to a first threshold; a reference signal measurement value corresponding to second user equipment is greater than or greater than or equal to a second threshold; a reference signal measurement value corresponding to the first network device is less than or less than or equal to a first threshold, and a reference signal measurement value corresponding to second user equipment is greater than or greater than or equal to a second threshold; a reference signal measurement value corresponding to second user equipment is greater than or greater than or equal to a sum of a reference signal measurement value corresponding to the first network device and a first offset; a reference signal measurement value corresponding to the first relay device is less than or less than or equal to a third threshold; a reference signal measurement value corresponding to the first relay device is less than or less than or equal to a third threshold, and a reference signal measurement value corresponding to second user equipment is greater than or greater than or equal to a fourth threshold; or a reference signal measurement value corresponding to second user equipment is greater than or greater than or equal to a sum of a reference signal measurement value corresponding to the first relay device and a second offset.

Optionally, that the processing module 1002 obtains a first condition based on the first configuration information may include: The first configuration information may include the first condition, and the processing module 1002 obtains the first condition from the first configuration information.

The first configuration information may further include first measurement object information, and the first measurement object information may include at least one of carrier information, a cell identifier, a user equipment identifier, and a network device identifier. When the first measurement object information may include the carrier information, a measurement object indicated by the first measurement object information is user equipment that works on a carrier corresponding to the carrier information. Alternatively, when the first measurement object information may include the cell identifier, a measurement object indicated by the first measurement object information is user equipment in a cell corresponding to the cell identifier. Alternatively, when the first measurement object information may include the user equipment identifier, a measurement object indicated by the first measurement object information is user equipment corresponding to the user equipment identifier. Alternatively, when the first measurement object information may include the network device identifier, a measurement object indicated by the first measurement object information is user equipment that camps on or is connected to a network device corresponding to the network device identifier.

Optionally, that the processing module 1002 obtains a first condition based on the first configuration information may include: The first configuration information may include second measurement object information and a measurement event, and the first user equipment obtains the first condition based on the second measurement object information and the measurement event, where the second measurement object information indicates the first user equipment to measure other user equipment, and the measurement event may include any one of the following: a reference signal measurement value corresponding to a serving node is less than or less than or equal to a first threshold; a reference signal measurement value corresponding to other user equipment, another cell, or another carrier is greater than or greater than or equal to a second threshold; a reference signal measurement value corresponding to a serving node is less than or less than or equal to a first threshold, and a reference signal measurement value corresponding to other user equipment, another cell, or another carrier is greater than or greater than or equal to a second threshold; or a reference signal measurement value corresponding to other user equipment, another cell, or another carrier is greater than or greater than or equal to a sum of a reference signal measurement value corresponding to a serving node and a first offset.

The second measurement object information may further include at least one of carrier information, a cell identifier, a user equipment identifier, and a network device identifier. When the second measurement object information may include the carrier information, a measurement object indicated by the second measurement object information is user equipment that works on a carrier corresponding to the carrier information. Alternatively, when the second measurement object information may include the cell identifier, a measurement object indicated by the second measurement object information is user equipment in a cell corresponding to the cell identifier. Alternatively, when the second measurement object information may include the user equipment identifier, a measurement object indicated by the second measurement object information is user equipment corresponding to the user equipment identifier. Alternatively, when the second measurement object information may include the network device identifier, a measurement object indicated by the second measurement object information is user equipment that camps on or is connected to a network device corresponding to the network device identifier.

Optionally, the sending module 1003 is further configured to send a solicitation message, where the solicitation message may include the first or second measurement object information; the obtaining module 1001 receives a response message from the user equipment indicated by the first or second measurement object information; and the processing module 1002 obtains a measurement value of the response message, and uses the measurement value of the response message as a reference signal measurement value corresponding to the user equipment indicated by the first or second measurement object information. Alternatively, the sending module 1003 is further configured to send a solicitation message; the obtaining module 1001 receives a response message; and when user equipment that sends the response message belongs to the user equipment indicated by the first or second measurement object information, the processing module 1002 obtains a measurement value of the response message, and uses the measurement value of the response message as a reference signal measurement value corresponding to the user equipment indicated by the first or second measurement object information. Alternatively, the obtaining module 1001 receives an announcement message; and when user equipment that sends the announcement message belongs to the user equipment indicated by the first or second measurement object information, the processing module 1002 obtains a measurement value of the announcement message, and uses the measurement value of the announcement message as a reference signal measurement value corresponding to the user equipment indicated by the first or second measurement object information.

The first network device and the second network device are a same network device, or the first network device and the second network device are different network devices.

The reference signal measurement value may include a reference signal received power (RSRP) value, reference signal received quality (RSRQ), a signal to interference plus noise ratio (SINR), or a received signal strength indicator (RSSI).

For example, the first configuration information is carried in a radio resource control (RRC) message.

Figure 11:
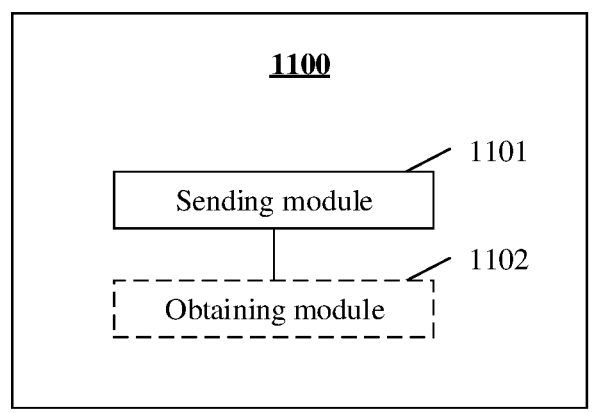
FIG. 11 is a schematic block diagram of a communication apparatus according to an embodiment of this application.

FIG. 11 is a schematic block diagram of a communication apparatus 1100 according to an embodiment of this application. The following specifically describes a structure and a function of the communication apparatus 1100 with reference to FIG. 1*i*. The communication apparatus 1100 may include: a sending module 1101, configured to send first configuration information to first user equipment, where the first configuration information may include a first condition; or the first configuration information may include second measurement object information and a measurement event, and the first user equipment obtains a first condition based on the second measurement object information and the measurement event, where the second measurement object information indicates the first user equipment to measure other user equipment, and the measurement event may include any one of the following: a reference signal measurement value corresponding to a serving node is less than or less than or equal to a first threshold; a reference signal measurement value corresponding to other user equipment, another cell, or another carrier is greater than or greater than or equal to a second threshold; a reference signal measurement value corresponding to a serving node is less than or less than or equal to a first threshold, and a reference signal measurement value corresponding to other user equipment, another cell, or another carrier is greater than or greater than or equal to a second threshold; or a reference signal measurement value corresponding to other user equipment, another cell, or another carrier is greater than or greater than or equal to a sum of a reference signal measurement value corresponding to a serving node and a first offset.

That the sending module 1101 sends first configuration information to first user equipment may include: The sending module 1101 sends the first configuration information through a wireless communication link between the sending module 1101 and the first user equipment; or the sending module 1101 sends the first configuration information to the first user equipment through a first relay device.

The first condition may include any one of the following: a reference signal measurement value corresponding to the first network device is less than or less than or equal to a first threshold; a reference signal measurement value corresponding to second user equipment is greater than or greater than or equal to a second threshold; a reference signal measurement value corresponding to the first network device is less than or less than or equal to a first threshold, and a reference signal measurement value corresponding to second user equipment is greater than or greater than or equal to a second threshold; a reference signal measurement value corresponding to second user equipment is greater than or greater than or equal to a sum of a reference signal measurement value corresponding to the first network device and a first offset; a reference signal measurement value corresponding to the first relay device is less than or less than or equal to a third threshold; a reference signal measurement value corresponding to the first relay device is less than or less than or equal to a third threshold, and a reference signal measurement value corresponding to second user equipment is greater than or greater than or equal to a fourth threshold; or a reference signal measurement value corresponding to second user equipment is greater than or greater than or equal to a sum of a reference signal measurement value corresponding to the first relay device and a second offset.

The communication apparatus 1100 further includes an obtaining module 1102, configured to receive a measurement report from the first user equipment.

Optionally, the sending module 1101 is further configured to send a path switch command to the first user equipment.

Figure 12:
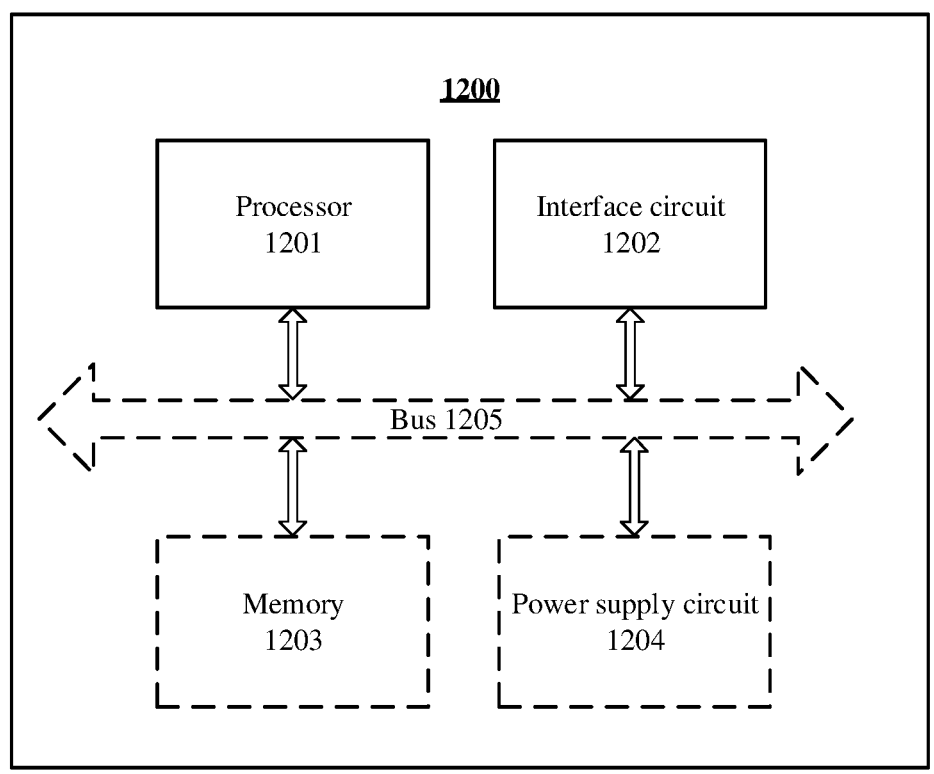
FIG. 12 is a schematic block diagram of an apparatus according to an embodiment of this application.

Based on a same technical concept, an embodiment of this application further provides an apparatus 1200. The following specifically describes a structure and a function of the apparatus 1200 with reference to a schematic block diagram of the apparatus 1200 in FIG. 12. The apparatus may include at least one processor 1201 and an interface circuit 1202. When related program instructions are executed in the at least one processor 1201, the apparatus 1200 may be enabled to implement the communication method and any possible design of the communication method provided in any one of the foregoing embodiments. The interface circuit 1202 may be configured to receive the program instructions and transmit the program instructions to the processor. Alternatively, the interface circuit 1202 may be used by the apparatus 1200 to communicate and interact with another communication device, for example, exchange control signaling and/or service data with another communication device. The interface circuit 1202 may be a code and/or data read and write interface circuit, or the interface circuit 1202 may be a signal transmission interface circuit between a communication processor and a transceiver. Optionally, the communication apparatus 1200 may further include at least one memory 1203, and the memory 1203 may be configured to store the related program instructions and/or data that are/is required. Optionally, the apparatus 1200 may further include a power supply circuit 1204. The power supply circuit 1204 may be configured to supply power to the processor 1201. The power supply circuit 1204 and the processor 1201 may be located in a same chip, or the power supply circuit 1204 may be located in a chip other than a chip in which the processor 1201 is located. Optionally, the apparatus 1200 may further include a bus 1205, and parts in the apparatus 1200 may be interconnected through the bus 1205.

It should be understood that the processor in embodiments of this application may be a central processing unit (CPU), or the processor may be another general-purpose processor, a digital signal processor (DSP), an application-specific integrated circuit (ASIC), a field programmable gate array (FPGA) or another programmable logic device, a discrete gate or a transistor logic device, a discrete hardware component, or the like. The general-purpose processor may be a microprocessor or the processor may be any conventional processor or the like.

It should be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), used as an external cache. By way of example but not limitation, many forms of a random access memory (RAM) are available, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), or a direct rambus random access memory (DR RAM).

The power supply circuit in embodiments of this application includes but is not limited to at least one of the following: a power supply line, a power supply subsystem, a power management chip, a power consumption management processor, or a power consumption management control circuit.

The transceiver apparatus, the interface circuit, or the transceiver in embodiments of this application may include a separate transmitter and/or a separate receiver, or the transmitter and the receiver may be integrated. The transceiver apparatus, the interface circuit, or the transceiver may work under an indication of a corresponding processor. Optionally, the transmitter may correspond to a transmitter machine in a physical device, and the receiver may correspond to a receiver machine in the physical device.

It may be clearly understood by a person skilled in the art that, for the purpose of convenient and brief description, division of the foregoing functional modules is used as an example for illustration. During actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, refer to a corresponding process in the foregoing method embodiments, and details are not described herein again.

In embodiments of this application, it should be understood that the disclosed systems, apparatuses, and methods may be implemented in other manners. For example, the described apparatus embodiments are merely examples. For example, division into the modules or units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electrical, mechanical, or another form.

A person of ordinary skill in the art may be aware that, in combination with examples described in embodiments disclosed in this specification, units or algorithm operations may be implemented by hardware, software, or a combination of software and hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

In this application, "implemented by software" may mean that a processor reads and executes program instructions stored in a memory to implement a function corresponding to the foregoing module or unit. The processor is a processing circuit that has a function of executing the program instructions, and includes but is not limited to at least one of the following: types of processing circuits that can execute the program instructions such as a central processing unit (CPU), a microprocessor, a digital signal processor (DSP), a microcontroller unit (MCU), or an artificial intelligence processor. In some other embodiments, the processor may further include a circuit that has another processing function (for example, a hardware circuit, a bus, and an interface circuit that are used for hardware acceleration). The processor may be presented in a form of an integrated chip. For example, the processor may be presented in a form of an integrated chip whose processing function includes only a function of executing software instructions; or the processor may be presented in a form of a SoC (system-on-a chip). To be specific, on one chip, in addition to the processing circuit (which is usually referred to as a "core") that can execute the program instructions, another hardware circuit configured to implement a specific function is further included (where certainly, the hardware circuit may also be independently implemented based on an ASIC or an FPGA). Correspondingly, in addition to the function of executing software instructions, processing functions may further include various hardware acceleration functions (such as AI computing, encoding and decoding, and compression and decompression).

In this application, "implemented by hardware" means that a function of the foregoing module or unit is implemented through a hardware processing circuit that does not have a function of processing program instructions. The hardware processing circuit may include a discrete hardware component, or may be an integrated circuit. To reduce power consumption and a size, an integrated circuit is usually used for implementation. The hardware processing circuit may include an ASIC or a PLD (programmable logic device, programmable logic device), where the PLD may further include an FPGA, a CPLD (complex programmable logic device, complex programmable logic device), and the like. These hardware processing circuits may be an independently packaged semiconductor chip (for example, packaged into an ASIC), or may be integrated with another circuit (such as a CPU or a DSP) and then packaged into a semiconductor chip. For example, a plurality of hardware circuits and CPUs may be formed on one silicon base, and are independently packaged into a chip, where the chip is also referred to as a SoC; or a circuit that is configured to implement an FPGA function and a CPU may be formed on a silicon base, and are independently packaged into a chip, where the chip is also referred to as a SoPC (system-on-a-programmable-chip).

It should be noted that, when this application is implemented by using software, hardware, or a combination of software and hardware, this application may be implemented by using different software and hardware, which is not limited to only one type of software or hardware. For example, one of the modules or units may be implemented through the CPU, and another module or unit may be implemented through the DSP. Similarly, when hardware is used for implementation, one of the modules or units may be implemented through the ASIC, and another module or unit may be implemented through the FPGA. Certainly, it is also not specified that some or all modules or units are implemented by using a same type of software (for example, through the CPU) or a same type of hardware (for example, through the ASIC). In addition, a person skilled in the art may know that, software generally has better flexibility but poorer performance than hardware, and hardware is exactly opposite. Therefore, a person skilled in the art may select software, hardware, or a combination thereof for implementation based on an actual requirement.

In the foregoing embodiments, the descriptions of each embodiment have respective focuses. For a part that is not described in detail in an embodiment, refer to related descriptions in other embodiments. Embodiments of this application may be combined, or some technical features in embodiments may be decoupled from specific embodiments and combined with a conventional technology, to resolve the technical problem in embodiments of this application.

In embodiments of this application, the units described as separate components may or may not be physically separate, and components displayed as units may or may not be physical units, may be located in one position, or may be distributed on a plurality of network units. Some or all of the units may be selected based on actual requirements to achieve the objectives of the solutions of embodiments in this application.

In addition, functional units in embodiments of this application may be integrated into one processing unit, each of the units may exist alone physically, or two or more units may be integrated into one unit. The integrated unit may be implemented in a form of hardware, or may be implemented in a form of a software functional unit.

When the integrated unit is implemented in the form of the software functional unit and sold or used as an independent product, the integrated unit may be stored in a computer-readable storage medium. Based on such an understanding, the technical solutions of this application essentially, or the part contributing to the conventional technology, or all or a part of the technical solutions may be implemented in the form of a software product. The computer software product is stored in a storage medium and may include several instructions for instructing a computer device, for example, a personal computer, a server, or a network device, or a processor to perform all or a part of the operations of the methods described in embodiments of this application. The foregoing storage medium may include any medium or computer-readable storage medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application.

What is claimed is:

1. A communication apparatus comprising:
at least one processor coupled to at least one memory storing at least one computer program, wherein the at least one processor is configured to execute the at least one computer program stored in the at least one memory, to cause the communication apparatus to:
receive first configuration information from a first network device;
obtain a first condition from the first configuration information;
send a measurement report to the first network device when the first condition is met, wherein the measurement report includes identification information of at least one second terminal, and the identification information of the at least one second terminal is at least one layer 2 identifier;
receive a path switch command from the first network device, wherein the path switch command comprises identification information of X third terminals, and X is a positive integer, and the identification information of the X third terminals are X layer 2 identifiers;
determine a first relay device in the X third terminals; and
communicate with a second network device through the first relay device, wherein the communication apparatus is a first terminal or included in the first terminal.

2. The communication apparatus according to claim 1, wherein the communication apparatus being caused to determine the first relay device in the X third terminals comprises the communication apparatus being caused to:
when X is equal to 1, determine that the third terminal is the first relay device; or
when X is greater than 1, select the first network device from the X third terminals.

3. The communication apparatus according to claim 1, wherein the communication apparatus being caused to receive the first configuration information comprises the communication apparatus being caused to:
receive the first configuration information through a wireless communication link between the first terminal and the first network device; or
receive the first configuration information from the first network device through a second relay device.

4. The communication apparatus according to claim 1, wherein the first condition comprises any one of the following:

a reference signal measurement value corresponds to the first network device and is less than or less than or equal to a first threshold;
a reference signal measurement value corresponds to a second terminal and is greater than or greater than or equal to a second threshold;
a reference signal measurement value corresponds to the first network device and is less than or less than or equal to a first threshold, and a second reference signal measurement value corresponding to a second terminal is greater than or greater than or equal to a second threshold;
a reference signal measurement value corresponds to the second terminal, and is greater than or greater than or equal to a sum of a third reference signal measurement value corresponding to the first network device and a first offset;
a reference signal measurement value corresponds to the first relay device and is less than or less than or equal to a third threshold; a fourth reference signal measurement value corresponds to the first relay device and is less than or less than or equal to a third threshold, and a fourth reference signal measurement value corresponds to a second terminal and is greater than or greater than or equal to a fourth threshold; or
a reference signal measurement value corresponds to the second terminal and is greater than or greater than or equal to a sum of a fifth reference signal measurement value corresponding to the first relay device and a second offset.

5. The communication apparatus according to claim 1, wherein
the first configuration information comprises the first condition, and the first terminal obtains the first condition from the first configuration information.

6. The communication apparatus according to claim 5, wherein:
the first configuration information further comprises first measurement object information, and the first measurement object information comprises carrier information; and
a measurement object indicated by the first measurement object information is a terminal that works on a carrier corresponding to the carrier information.

7. The communication apparatus according to claim 6, wherein the at least one processor is configured to further execute the at least one computer program to cause the communication apparatus to:
send a solicitation message, wherein the solicitation message comprises the first measurement object information or a second measurement object information;
receive a response message from the terminal indicated by the first or second measurement object information; and obtain a measurement value of the response message, and use the measurement value of the response message as a reference signal measurement value corresponding to the terminal indicated by the first or second measurement object information;
send a solicitation message; receive a response message; and when a terminal that sends the response message belongs to the terminal indicated by the first or second measurement object information, obtain a measurement value of the response message, and use the measurement value of the response message as a reference signal measurement value corresponding to the terminal indicated by the first or second measurement object information; or receive an announcement message; and when a terminal that sends the announcement message belongs to the terminal indicated by the first or second measurement object information, obtain a measurement value of the announcement message, and use the measurement value of the announcement message as a reference signal measurement value corresponding to the terminal indicated by the first or second measurement object information.

8. The communication apparatus according to claim 1, wherein the first network device and the second network device are a same network device, or the first network device and the second network device are different network devices.

9. The communication apparatus according to claim 4, wherein the reference signal measurement value comprises a reference signal received power (RSRP) value, reference signal received quality (RSRQ), a signal to interference plus noise ratio (SINR), or a received signal strength indicator (RSSI).

10. The communication apparatus according to claim 1, wherein the first configuration information is carried in a radio resource control (RRC) message.

11. A communication apparatus comprising:
at least one processor coupled to at least one memory storing at least one computer program, wherein the at least one processor is configured to execute the at least one computer program stored in the at least one memory, to cause the communication apparatus to:
receive first configuration information from a first network device through a first relay device;
obtain a second condition from the first configuration information;
send a measurement report to the first network device when the second condition is met;
receive a path switch command from the first network device, wherein the path switch command comprises identification information of Y cells or Y carriers, and Y is a positive integer; and
determine a first cell or a first carrier; and
communicate with a second network device through the first cell, or communicate with the second network device through the first carrier.

12. The communication apparatus according to claim 11, wherein the communication apparatus being caused to determine the first cell or the first carrier comprises the communication apparatus being caused to:
when Y is equal to 1, determine that a cell comprised in the path switch command is the first cell, or determine that a carrier comprised in the path switch command is the first carrier; or
when Y is greater than 1, select the first cell from the Y cells, or select the first carrier from the Y carriers.

13. The communication apparatus according to claim 11, wherein the second condition comprises any one of the following:
a reference signal measurement value corresponds to a serving cell and is less than or less than or equal to a ninth threshold;
a reference signal measurement value corresponds to another cell and is greater than or greater than or equal to a tenth threshold;
a reference signal measurement value corresponds to a serving cell is less than or less than or equal to the ninth threshold, and a second reference signal measurement value corresponding to the another cell is greater than or greater than or equal to the tenth threshold;
a reference signal measurement value corresponds to the another cell and is greater than or greater than or equal to a sum of a third reference signal measurement value corresponding to the serving cell and a fifth offset;
a reference signal measurement value corresponds to a serving carrier and is less than or less than or equal to the ninth threshold;
a reference signal measurement value corresponds to another carrier and is greater than or greater than or equal to the tenth threshold;
a reference signal measurement value corresponds to the serving carrier and is less than or less than or equal to the ninth threshold, and a fourth reference signal measurement value corresponds to the another carrier and is greater than or greater than or equal to the tenth threshold;
a reference signal measurement value corresponds to the another carrier and is greater than or greater than or equal to a sum of a fifth reference signal measurement value corresponding to the serving carrier and a fifth offset;
a reference signal measurement value corresponds to the first relay device and is less than or less than or equal to an eleventh threshold;
a reference signal measurement value corresponds to the first relay device and is less than or less than or equal to an eleventh threshold, and a sixth reference signal measurement value corresponding to a cell is greater than or greater than or equal to a twelfth threshold;
a reference signal measurement value corresponds to a cell and is greater than or greater than or equal to a sum of a seventh reference signal measurement value corresponding to the first relay device and a sixth offset;
a reference signal measurement value corresponds to the first relay device and is less than or less than or equal to the eleventh threshold, and an eighth reference signal measurement value corresponding to a carrier is greater than or greater than or equal to the twelfth threshold; or
a reference signal measurement value corresponds to the carrier is greater than or greater than or equal to a sum of a ninth reference signal measurement value corresponding to the first relay device and a sixth offset.

14. The communication apparatus according to claim 11, wherein the first configuration information comprises the second condition.

15. The communication apparatus according to claim 14, wherein
the first configuration information further comprises third measurement object information, and the third measurement object information comprises carrier information; and
a measurement object indicated by the third measurement object information is a carrier corresponding to the carrier information.

16. The communication apparatus according to claim 11, wherein the first network device and the second network device are a same network device, or the first network device and the second network device are different network devices.

17. The communication apparatus according to claim 11, wherein the second condition comprises a reference signal measurement value, wherein the reference signal measurement value comprises a reference signal received power (RSRP) value, reference signal received quality (RSRQ), a signal to interference plus noise ratio (SINR), or a received signal strength indicator (RSSI).

18. The communication apparatus according to claim 11, wherein the first configuration information is carried in a radio resource control (RRC) message.

19. A communication apparatus comprises:
- at least one processor coupled to at least one memory storing at least one computer program, wherein the communication apparatus is a first network device or included in the first network device, wherein the at least one processor is configured to execute the at least one computer program stored in the at least one memory, to enable the communication apparatus to:
  - send first configuration information to a first terminal, wherein the first configuration information comprises a first condition, wherein the first condition comprises any one of the following:
    - a reference signal measurement value corresponding to the first network device is less than or less than or equal to a first threshold;
    - a reference signal measurement value corresponding to a second terminal is greater than or greater than or equal to a second threshold;
    - a first reference signal measurement value corresponding to the first network device is less than or less than or equal to a first threshold, and a second reference signal measurement value corresponding to a second terminal is greater than or greater than or equal to a second threshold;
    - a first reference signal measurement value corresponding to a second terminal is greater than or greater than or equal to a sum of a second reference signal measurement value corresponding to the first network device and a first offset;
    - a reference signal measurement value corresponding to a first relay device is less than or less than or equal to a third threshold;
    - a first reference signal measurement value corresponding to the first relay device is less than or less than or equal to a third threshold, and a second reference signal measurement value corresponding to a second terminal is greater than or greater than or equal to a fourth threshold; or
    - a first reference signal measurement value corresponding to a second terminal is greater than or greater than or equal to a sum of a second reference signal measurement value corresponding to the first relay device and a second offset; and
  - receive a measurement report from the first terminal when the first condition is met, wherein the measurement report includes identification information of at least one second terminal, and the identification information of at least one second terminal is at least one layer 2 identifier.

20. The communication apparatus according to claim 19, wherein
- the first configuration information further comprises first measurement object information, and the first measurement object information comprises carrier information; and
- when the first measurement object information comprises the carrier information, a measurement object indicated by the first measurement object information is a terminal that works on a carrier corresponding to the carrier information.

\* \* \* \* \*